US012795335B2

(12) United States Patent
Palaniappan

(10) Patent No.: US 12,795,335 B2
(45) Date of Patent: Nov. 10, 2026

(54) SELECTIVE BILLING IN WIRELESS COMMUNICATION NETWORKS

(71) Applicant: T-MOBILE INNOVATIONS LLC, Overland Park, KS (US)

(72) Inventor: Murugappan Palaniappan, Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 189 days.

(21) Appl. No.: 18/924,325

(22) Filed: Oct. 23, 2024

(65) Prior Publication Data

US 2026/0113601 A1 Apr. 23, 2026

(51) Int. Cl.

| | |
|---|---|
| ***H04W 4/24*** | (2024.01) |
| ***G06F 8/20*** | (2018.01) |
| ***H04L 12/14*** | (2024.01) |
| ***H04M 15/00*** | (2024.01) |

(52) U.S. Cl.
CPC ................ *H04W 4/24* (2013.01); *G06F 8/20* (2013.01); *H04L 12/14* (2013.01); *H04L 12/1403* (2013.01); *H04M 15/41* (2013.01); *H04M 15/8228* (2013.01)

(58) Field of Classification Search
CPC .......... H04W 4/24; H04W 8/20; H04L 12/14; H04L 12/1403; H04L 12/1471; H04L 65/1016; H04L 12/1407; H04L 12/1482
See application file for complete search history.

(56) References Cited

U.S. PATENT DOCUMENTS 11,315,086 B2 * 4/2022 Omori .................... H04M 15/00
2012/0208495 A1 * 8/2012 Lawson .............. H04L 12/1446 455/406
2020/0267008 A1 * 8/2020 Chen ........................ H04W 4/24

* cited by examiner

*Primary Examiner* — Nam T Huynh

(57) ABSTRACT

Various embodiments include a system that comprises an application creation engine, a core network, a user charging system, and a developer charging system. The application creation engine receives a service request for an application from a developer computing system in response to a user device launching the application. The engine directs the core network to establish a session for the application. The engine determines a developer usage amount for the developer computing system and indicates the usage amount to the developer charging system. The core network determines a user usage amount and indicates the user usage amount to the user charging system. The developer charging system generates a charge for the developer computing system and surfaces the charge to the developer computing system. The user charging system generates a charge for the user device and surfaces the user charge to a billing system associated with the user device.

20 Claims, 14 Drawing Sheets

100

SELECTIVE BILLING IN WIRELESS COMMUNICATION NETWORKS

TECHNICAL FIELD

Various embodiments of the present technology relate to billing, and more specifically, to selectively billing application developers and end users in wireless communication networks.

BACKGROUND

Wireless communication networks provide wireless data services to wireless user devices. Exemplary wireless data services include voice calling, video calling, internet-access, media-streaming, online gaming, social-networking, and machine-control. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

Some wireless communication networks provide application developers with back-end interfaces to create applications and select network features for the applications. Exemplary network features include network slicing, low-latency, high-throughput, enhanced Quality-of-Service (QoS), Quality-on-Demand (QoD) service, and the like. Once created, end users may purchase subscriptions for the applications and download the applications on their user devices. The networks provide data sessions for the applications to subscribed user devices. The communication networks use charging systems to track and bill end users for the service they receive on the network. However, conventional billing systems are unable to track back-end usage by the application developers and charge the application developers for the back-end usage.

Unfortunately, in some cases, wireless communication networks may not effectively or efficiently differentiate front-end usage by end-users and back-end usage by application developers. Moreover, in some cases, the wireless communication networks may not selectively bill end users and application developers for their respective network usage.

OVERVIEW

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for billing. Some embodiments comprise a method. The method comprises receiving, by an application creation engine, a service request for an application from a developer computing system in response to a user device launching the application. The application is associated with the developer computing system. The method further comprises directing, by the application creation engine, a core network to establish a session for the application in response to the service request. The method further comprises determining, by the application creation engine, a developer usage amount of the application creation engine by the developer computing system and indicating the developer usage amount to a developer charging system. The method further comprises determining, by the core network, a user usage amount of the session by the user device and indicating the user usage amount to a user charging system. The method further comprises generating, by the developer charging system, a developer charge for the developer computing system based on the developer usage amount and surfacing the developer charge to the developer computing system. The method further comprises generating, by the user charging system, a user charge for the user device based on the user usage amount and surfacing the user charge to a billing system associated with the user device.

Some embodiments comprise a system. The system comprises an application creation engine, a core network, a user charging system, and a developer charging system. The application creation engine receives a service request for an application from a developer computing system in response to a user device launching the application. The application is associated with the developer computing system. The application creation engine directs the core network to establish a session for the application in response to the service request. The application creation engine determines a developer usage amount of the application creation engine by the developer computing system. The application creation engine indicates the developer usage amount to the developer charging system. The core network determines the user usage amount of the session by the user device and indicates the user usage amount to the user charging system. The developer charging system generates a developer charge for the developer computing system based on the developer usage amount and surfaces the developer charge to the developer computing system. The user charging system generates a user charge for the user device based on the user usage amount and surfaces the user charge to a billing system associated with the user device.

Some embodiments comprise one or more non-transitory computer readable storage media having program instructions stored thereon. When executed by a computing system, the program instructions direct the computing system to perform operations. The operations comprise receiving an Application Programming Interface (API) call from an application developer computing system that requests an enablement of one or more network features for a session for an application launched by a user device. The application developer computing system is associated with the application. The operations further comprise authorizing the requested one or more network features for the session for the application launched by a user device. The operations further comprise directing a core network to enable the one or more network features for the session for the application. The operations further comprise indicating a developer Identifier (ID) for the application developer, developer network usage, and the one or more network features to a developer charging system. The developer charging system generates a developer Call Detail Record (CDR) that indicates the developer ID, developer network usage, and the one or more network features and surfaces the developer CDR to the application developer computing system. The operations further comprise indicating the developer ID, an application ID for the application, the one or more network features, and biller ID for a billing system associated with the user device to a user charging system. The user charging system receives user network usage from the core network, generates a user CDR that indicates the user network usage, the developer ID, the application ID, the one or more network features, and the biller ID, and surfaces the user CDR to the billing system associated with the user device.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
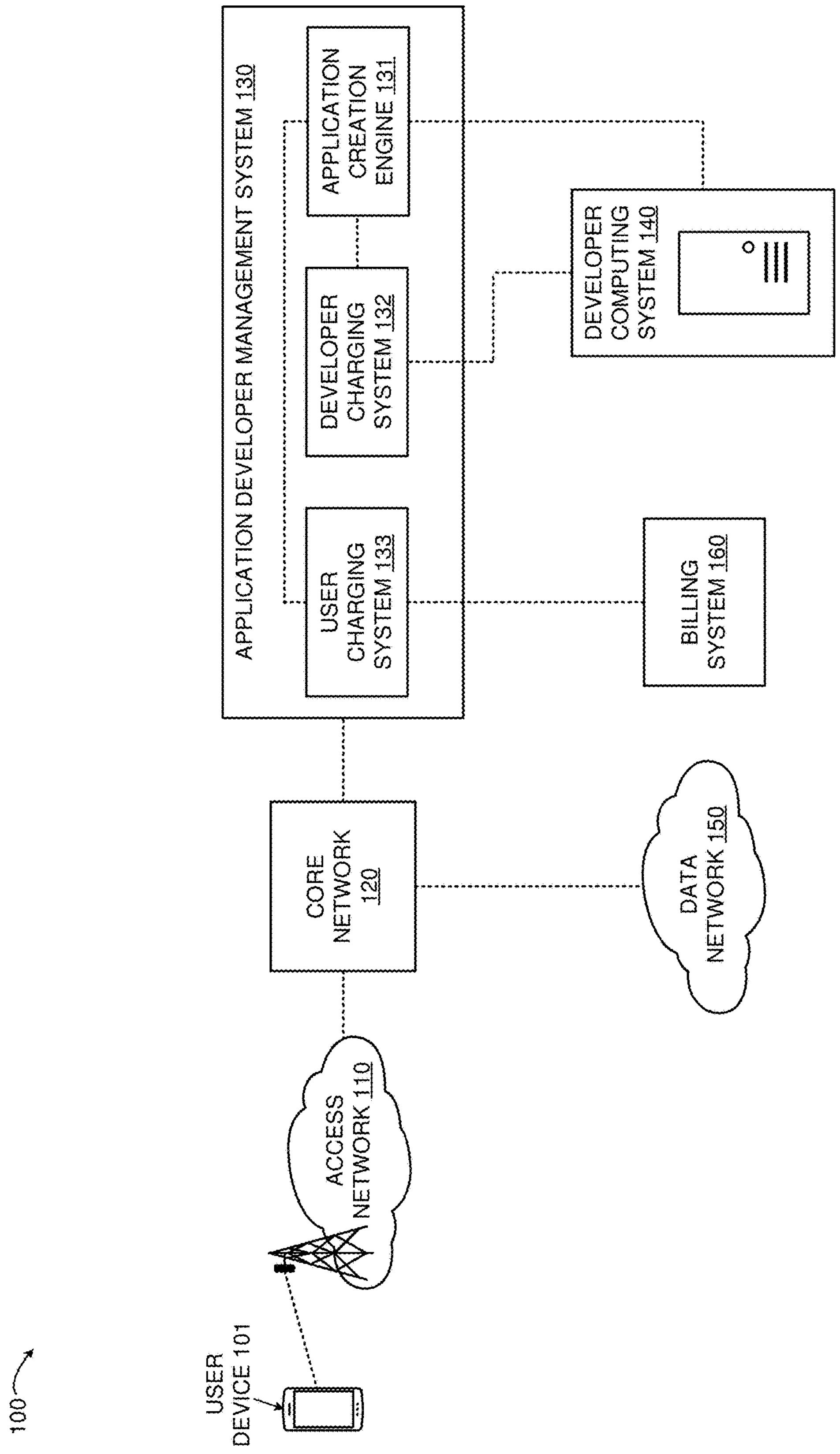
FIG. 1 illustrates an example communication network to enable selective billing of application developers and end users.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

In conventional wireless communication networks, application developers are not able to utilize network resources to create user applications which are then made available to end users over the network. This inhibits the application developers from tailoring network services for their applications. Some wireless communication networks provide back-end interfaces which allow application developers to utilize network resources to build applications. The back-end interfaces typically comprise Application Programming Interfaces (APIs) that allow the application developers to select network features for, build, and register their applications. These communication networks have billing systems that track data usage by end users and charge the end users based on their data usage. However, the communication networks do not track back-end API usage by the application developers. Moreover, the billing systems lack the capability to differentiate between front-end and back-end network usage.

To overcome the above-described problems, various embodiments of the present technology relate to enabling selective billing of application developers and end users. In some examples, a wireless communication network comprises a runtime engine that provides a back-end interface for application developers to build applications on the network. The network additionally comprises a charging system and a developer charging system. The charging system tracks end user usage of the application created by the application developer. The developer charging system tracks usage of the runtime engine usage by the application developer. The network utilizes a developer portal to expose the end user usage and the runtime engine usage to the application developer. The bifurcated charging system allows the network to bill the end user or the application developer for the end user usage and bill the application developer for their use of the runtime engine. Now referring to the Figures.

FIG. 1 illustrates communication network 100 to enable selective billing of application developers and end users. Communication network 100 provides services like media-streaming, internet-access, voice/video calling, text messaging, online gaming, media-broadcasting, social media, machine communications, or some other wireless communications product. Communication network 100 comprises user device 101, access network 110, core network 120, application developer management system 130, developer computing system 140, data network 150, and billing system 160. Application developer management system 130 comprises application creation engine 131, developer charging system 132, and user charging system 133. In other examples, communication network 100 may comprise additional or different elements than those illustrated in FIG. 1.

Various examples of network operation and configuration are described herein. In some examples, user device 101 attaches to core network 120 over access network 110 and launches a user application associated with developer computing system 140. User device 101 transfers a session request to core network 120 for the application. For example, the application may comprise a video streaming application developed by developer computing system 140 and user device 101 may request a video streaming session.

Core network 120 notifies developer computing system 140 of the session request. In response, developer computing system 140 transfers a service request for the session for the application launched by user device 101 to application creation engine 131. The service request may comprise an Application Programming Interface (API) call and include information like a user Identifier (ID) for user device 101, an application ID for the application, and a network feature list (e.g., network slice types, QoS, etc.) for the application. The user ID typically comprises the Mobile Station International Subscriber Directory Number (MSISDN) of user device 101, however other user identifies like International Mobile Subscriber Identity (IMSI), Subscriber Concealed Identifier (SUCI), Subscriber Permanent Identifier (SUPI), and Permanent Equipment Identifier (PEI) may be used. Application creation engine 131 receives the service request and authorizes the session for the application. For example, application creation engine 131 may interface with an authorization manager to map the requested one or more network features to the application ID to authorize the session. Application creation engine 131 directs core network to establish the session for the application in response to the service request. Core network 121 enables the requested network feature(s) and serves the session to user device 101. Core network 121 exchanges user data with user device 101 over access network 110 and exchanges the user data with data network 150.

Application creation engine 131 tracks network usage (e.g., request volume, requested network features, etc.) by developer computing system 140 and reports the usage to developer charging system 132. Similarly, core network 121 tracks network usage (e.g., data volume, usage time, etc.) by user device 101 and reports the usage to user charging system 133. In doing so, application developer management system 130 differentiates user device usage and developer usage on communication network 100. Developer charging system 132 generates a charge for developer computing system 140 based on the network usage by developer computing system 140. Developer charging system 132 surfaces the charge to developer computing system 140. User charging system 133 generates a charge for user device 101 based on the network usage by user device 101. User charging system 133 surfaces the charge to billing system 160. Billing system 160 is representative of the biller for user device 101.

Advantageously communication network 100 effectively and efficiently differentiates front-end usage by end-users and back-end usage by application developers. Moreover, communication network 100 selectively bills end users and application developers for their respective network usage.

User device 101 comprises a vehicle, drone, robot, computer, phone, sensor, or another type of data appliance with wireless and/or wireline communication circuitry. User device 101 and access network 110 communicate over links using wireless/wireline technologies like Sixth Generation Radio (6GR), Fifth Generation New Radio (5GNR), Long Term Evolution (LTE), Institute of Electrical and Electronic Engineers (IEEE) 802.11 (WiFi), IEEE 802.3 (Ethernet), Low-Power Wide Area Network (LP-WAN), Bluetooth, and/or some other type of wireless and/or wireline networking protocol. The wireless technologies use electromagnetic frequencies in the low-band, mid-band, high-band, or some other portion of the electromagnetic spectrum. The wired connections comprise metallic links, glass fibers, and/or some other type of wired interface.

Although access network 110 is illustrated as comprising a tower, access network 110 may comprise another type of mounting structure (e.g., a building), or no mounting structure at all. Access network 110 may comprise a Sixth Generation (6G) Radio Access Network (RAN), Fifth Generation (5G) RAN, LTE RAN, 6G NodeB, gNodeB, eNodeB, Narrow Band Internet-of-Things (NB-IoT) access node, trusted non-Third Generation Partnership Project (3GPP) access node, untrusted non-3GPP access node, Low Power-Wide Area Network (LP-WAN) base station, wireless relay, WiFi hotspot, Bluetooth access node, Ethernet access node, and/or another type of wireless or wireline network transceiver. Access network 110 exchanges network signaling and user data with network functions clustered together into core network 120. Access network 110 is connected to core network 120 over backhaul data links. Access network 110 and core network 120 may communicate via edge networks like internet backbone providers, edge computing systems, or another type of edge system to provide the backhaul data and signaling links between access network 110 and core network 120.

Access network 110 may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to the network cores. The CUs handle higher wireless network layers like the Radio Resource Control (RRC), Service Data Adaption Protocol (SDAP), and Packet Data Convergence Protocol (PDCP). The CUs are coupled to network functions in core network 120.

Core network 120 is representative of computing systems that provide wireless data services to user device 101 over access network 110. Exemplary computing systems comprise Network Function Virtualization Infrastructure (NFVI) systems, data centers, server farms, cloud computing networks, hybrid cloud networks, and the like. Core network 120 may comprise a 3GPP core network architecture like Sixth Generation Core (6GC), Fifth Generation Core (5GC), Evolved Packet Core (EPC), and/or another type of 3GPP core network architecture. Access network 110, core network 120, application developer management system 130, developer computing system 140, data network 150, and billing system 160 communicate over various links that use metallic links, glass fibers, radio channels, or some other communication media. The links use 6GC, 5GC, EPC, Ethernet, Time Division Multiplex (TDM), Data Over Cable System Interface Specification (DOCSIS), Internet Protocol (IP), General Packet Radio Service Transfer Protocol (GTP), 6GR, 5GNR, LTE, WiFi, virtual switching, inter-processor communication, bus interfaces, and/or some other data communication protocols. The various links coupling access network 110, core network 120, application developer management system 130, developer computing system 140, data network 150, and billing system 160 may be provided by internet backbone providers, edge computing systems, and the like.

The computing systems of core network 120 store and execute the network functions/entities to serve user device 101. The network functions are typically organized into a control plane and a user plane. The control plane may comprise network functions like Access and Mobility Management Function (AMF), Session Management Function (SMF), Unified Data Management (UDR), Unified Data Registry (UDR), Network Exposure Function (NEF), and Application Function (AF). The user plane may comprise network functions like User Plane Function (UPF) and the like.

Application developer management system 130 is representative of computing systems that onboard application developers, provide resources to application developers to create applications on communication network 100, authorize sessions for the applications when launched by user device 101, and bill users and/or developers for their respective network usage. Exemplary computing systems comprise NFVI systems, data centers, server farms, cloud computing networks, hybrid cloud networks, and the like.

Application creation engine 131 serves as the primary interface between developer computing system 140 and application developer management system 130 for developer onboarding, application creation, and application authorization. Application creation engine 131 onboards application developers, registers applications created by the developers, and enables network features for the applications to facilitate application creation and use on communication network 100 by developer computing system 140. Application creation engine 131 may be representative of a runtime computing environment that comprises a software component that executes code written in specific languages or frameworks during program execution. Exemplary runtime environments include Java Runtime Environment, .NET Common Language Runtime, Node.js, V8, Python Interpreter, Matz's Ruby Interpreter, PHP Engine, Erlang Virtual Machine, and the like.

Application developer management system 130 may include an authorization manager (not illustrated for clarity) that authorizes application sessions on core network 120 based on factors like user ID, application ID, developer ID, network feature(s), and the like. For example, the authorization manager may map requested network slice types to allowed network slice types for an application to authorize a data session for the application. The authorization manager may comprise network entities like Identity and Access Management (IAM), Authentication Server Function (AUSF), and the like. Developer charging system 132 determines charges for application developers based on their usage of application creation engine 131 (e.g., request call volume, application features like slice type, QoS, latency, and throughput, etc.). User charging system 133 determines charges for users (e.g., the user of user device 101) based on their session usage (e.g., data volume, time of usage, number of uses, flat rate, etc.). User charging system 133 handles billing for users while developer charging system 132 handles billing for application developers. In some examples, user charging system 133 provides the charge for user device 101 to developer computing system 140 instead of billing system 160 to bill developer computing system 140 for user device 101's network usage. Developer charging system 132 and user charging system 133 may comprise network entities like Charging Function (CHF) and the like.

Developer computing system 140 is representative of one or more computing devices to build applications for user devices on communication network 100. Developer computing system 140 interfaces with application creation engine 131 to create applications (e.g., media streaming applications, social media applications, IoT applications, online gaming applications, etc.) available for user devices on communication network 100. Developer computing system 140 interfaces with application creation engine 131 to enable one or more network features for those applications when launched by the user devices. Exemplary network features include network slices, Quality-of-Service (QoS), Quality-on-Demand (QoD), latency, throughput, and the like. QoD service is a type of pay-per-use service. For example, a QoD enabled application may receive temporarily enhanced service (e.g., enhanced QoS, latency, throughput, slicing, etc.) during the session duration. The session duration may comprise a time duration and/or a data amount. At the end of the session duration, the enhanced features are disabled for the session. A network slice is a type of network partition (e.g., group of network functions and/or RAN elements) with capabilities to provide specific service types (e.g., low-latency service, high throughput service, etc.). Exemplary slice types include Ultra-Reliable Low-Latency Communication (URLLC), Enhanced Mobile Broadband (eMBB), and Massive Machine Type Communications (mMTC).

Data network 150 is representative of the data endpoint for user device 101's sessions. For example, if user device 101 launches a media streaming application created by developer computing system 140, the content hosting servers for the application may reside in data network 150. Data network 150 may comprise a public data network (e.g., the Internet) or a private data network (e.g., an enterprise network).

Billing system 160 is representative of a computing system to deliver charges derived by user charging system 133 to the user of user device 101. The billing systems in communication network 100 are typically associated with subscriber types like prepaid subscribers, postpaid subscribers, enterprise subscribers, and the like. For example, if the user of user device 101 purchased a postpaid subscription on communication network 100, billing system 160 may comprise the billing system for postpaid subscribers. In some embodiment, the billing system 160 may also bill other types of network users, such as application developers, for their network usage.

User device 101 and access network 110 comprise antennas, amplifiers, filters, modulation, analog/digital interfaces, microprocessors, software, memories, transceivers, bus circuitry, and the like. User device 101, access network 110, core network 120, application developer management system 130, developer computing system 140, data network 150, and billing system 160 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), Analog Processing Units (APUs), and/or the like. The memories comprise Random Access Memory (RAM), Solid State Drives (SSDs), Hard Disk Drives (HDDs), Non-Volatile Memory Express (NVMe) SSDs, and/or the like. The memories store software like operating systems, user applications, radio applications, and network functions. The microprocessors retrieve the software from the memories and execute the software to drive the operation of communication network 100 as described herein.

Figure 2:
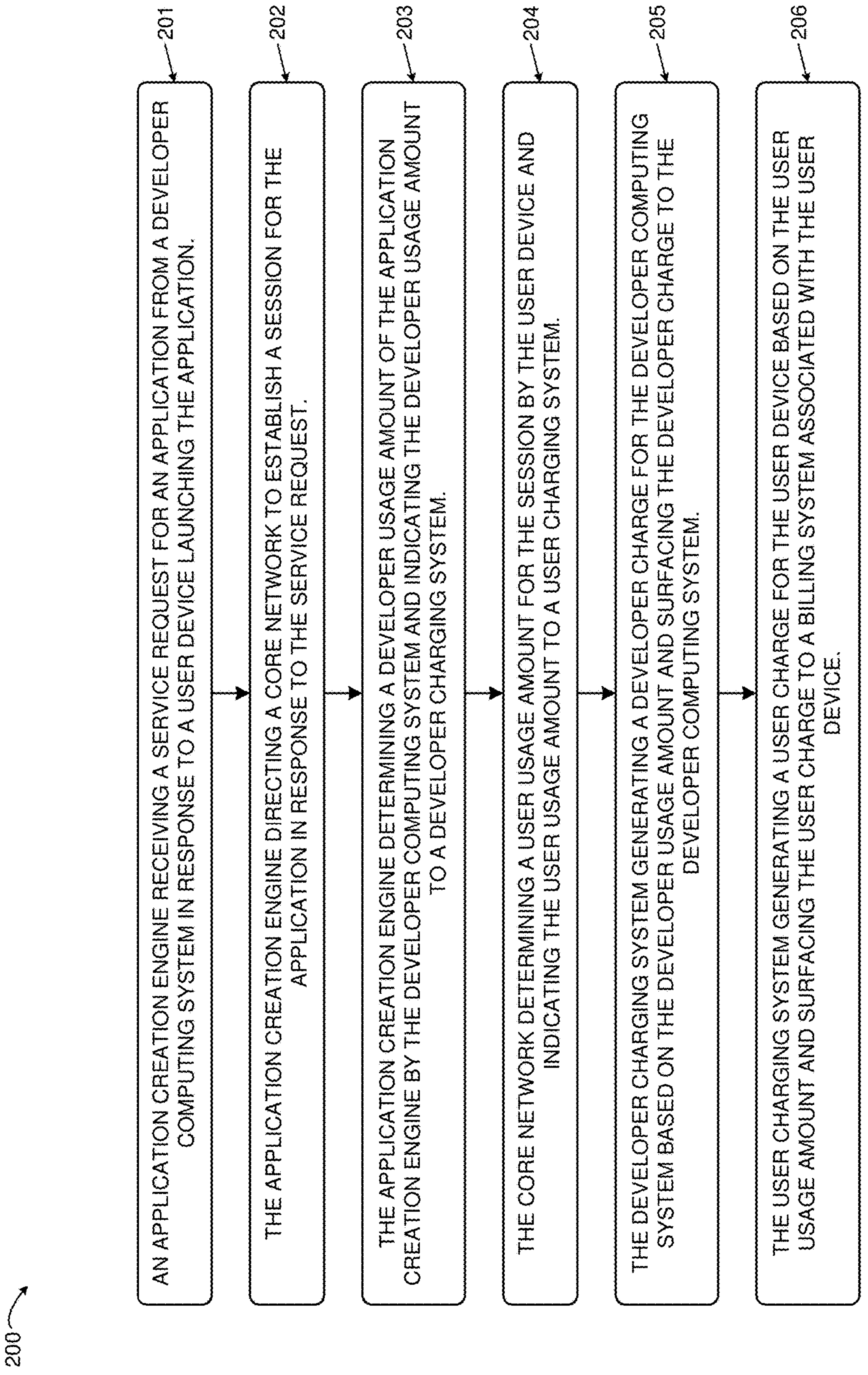
FIG. 2 illustrates a first example operation of the communication network to enable selective billing of application developers and end users.

FIG. 2 illustrates process 200. Process 200 comprises an exemplary operation of communication network 100 to enable selective billing of application developers and end users. Process 200 may vary in other examples. The operations of process 200 comprise an application creation engine receiving a service request for an application from a developer computing system in response to a user device launching the application (step 201). The developer computing system is associated with (e.g., is the developer of) the application. The operations further comprise the application creation engine directing a core network to establish a session for the application in response to the service request (step 202). The operations further comprise the application creation engine determining a developer usage amount of the application creation engine by the developer computing system and indicating the developer usage amount to a developer charging system (step 203). The operations further comprise the core network determining a user usage amount for the session by the user device and indicating the user usage amount to a user charging system (step 204). The operations further comprise the developer charging system generating a developer charge for the developer computing system based on the developer usage amount and surfacing the developer charge to the developer computing system (step 205). The operations further comprise the user charging system generating a user charge for the user device based on the user usage amount and surfacing the user charge to a billing system associated with the user device (step 206).

Figure 3:
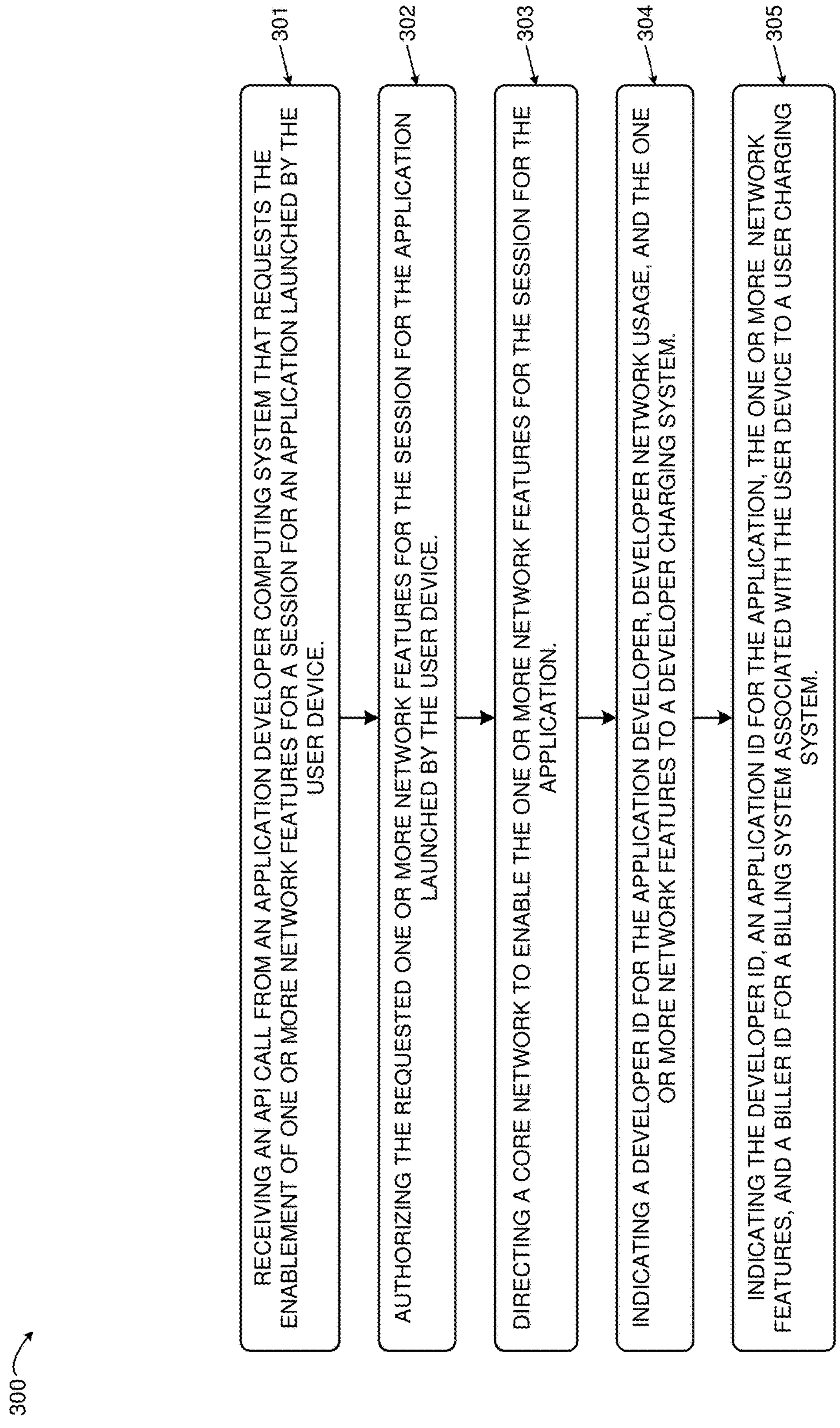
FIG. 3 illustrates a second example operation of the communication network to enable selective billing of application developers and end users.

FIG. 3 illustrates process 300. Process 300 comprises an exemplary operation of communication network 100 to enable selective billing of application developers and end users. Process 300 comprises an example of process 200 illustrated in FIG. 2, however process 200 may differ. Process 300 may vary in other examples. The operations of process 300 comprise receiving an API call from an application developer computing system that requests the enablement of one or more network features for a session for an application launched by the user device (step 301). The application developer computing system is associated with the application. The operations further comprise authorizing the requested one or more network features for the session for the application launched by the user device (step 302). The operations further comprise directing a core network to enable the one or more network features for the session for the application (step 303). The operations further comprise indicating a developer ID for the application developer, developer network usage, and the one or more network features to a developer charging system (step 304). The developer charging system generates a developer Call Detail Record (CDR) that indicates the developer ID, developer network usage, and the one or more network features, and then surfaces the developer CDR to the application developer computing system. The operations further comprise indicating the developer ID, an application ID for the application, the one or more network features, and a biller ID for a billing system associated with the user device to a user charging system (step 305). The user charging system receives user network usage from the core network, generates a user CDR that indicates the user network usage, the developer ID, the application ID, the one or more network features, and the biller ID, and surfaces the user CDR to the billing system associated with the user device.

Figure 4:
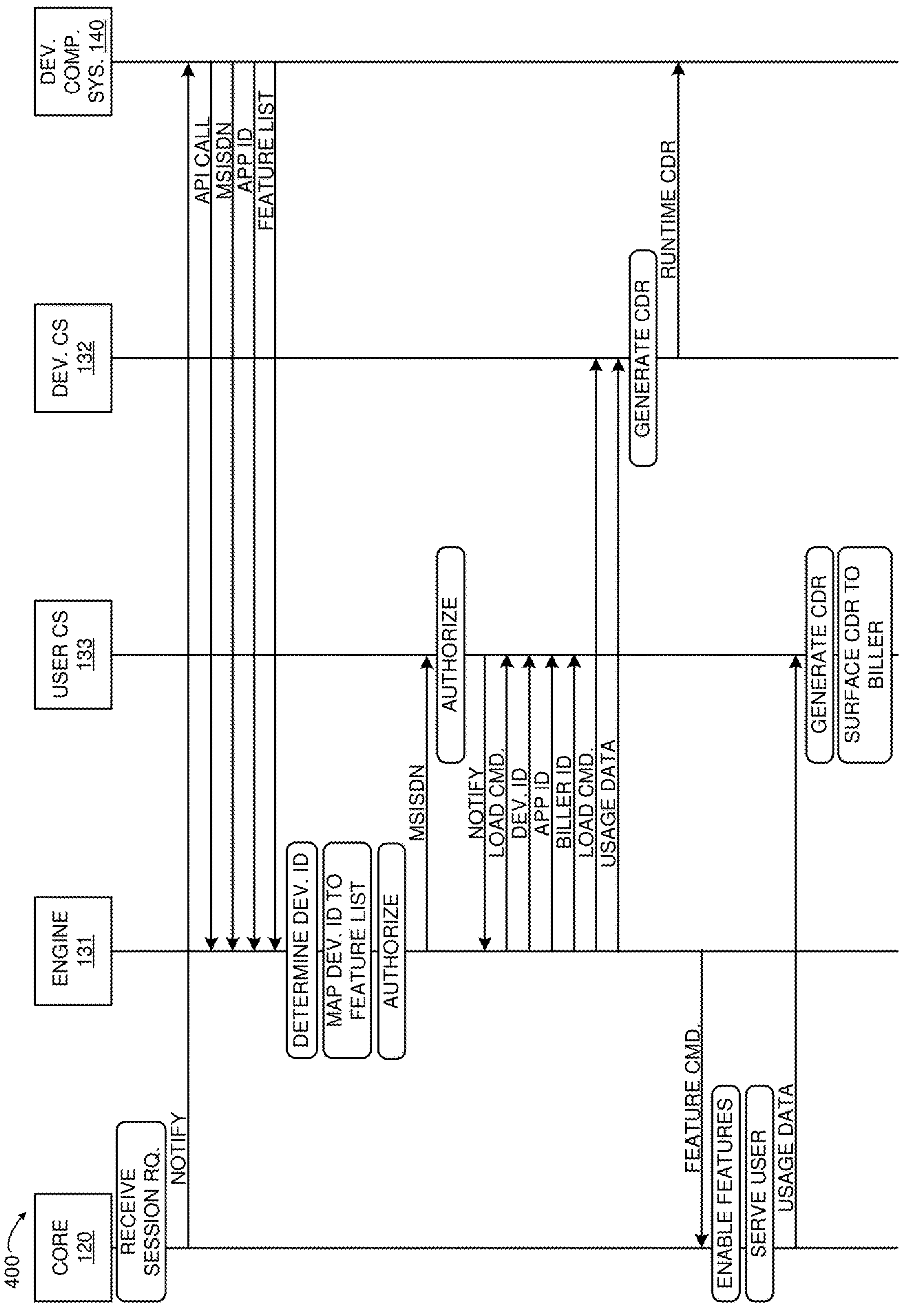
FIG. 4 illustrates a third example operation of the communication network to enable selective billing of application developers and end users.

FIG. 4 illustrates process 400. Process 400 comprises an exemplary operation of communication network 100 to enable selective billing of application developers and end users. Process 400 comprises an example of process 200 illustrated in FIG. 2 and process 300 illustrated in FIG. 3, however processes 200 and 300 may differ. Process 400 may vary in other examples. In some examples, core network 120 receives a Protocol Data Unit (PDU) session request (RQ.) from user device 101 to support a data session for an application created by developer computing system (DEV.COMP.SYS.) 140. Core network 120 notifies developer computing system 140 of the session request for user device 101. In response, developer computing system 140 transfers an API call that includes the MSISDN for user device 101, application ID for the application, and feature list for the application to application creation engine 131. Application creation engine 131 determines the developer ID for the application, maps the developer ID to a feature list, and authorizes the one or more network features for the session when the requested one or more network features match the feature list. For example, application creation engine 131 may interface with an authorization manager to authorize the session. Application creation engine 131 may indicate the application ID to the authorization manager to determine the developer ID for the application developer and to authorize the requested feature(s). The authorization manager may host a data structure that correlates application IDs with developer IDs. The authorization manager may input the application ID indicated by application creation engine 131 to the data structure to determine the developer ID. The authorization manager may map the developer ID to a subscribed feature list and then compare the requested feature(s) to the subscribed feature list. For example, if the developer is subscribed to an URLLC slice, the authorization manager may authorize the session when the requested feature is a URLLC slice. The authorization manager may authorize the application when the subscribed and requested feature(s) match and notify application creation engine 131 of the authorization.

Application creation engine 131 indicates the MSISDN for user device 101 to user charging system (USER CS) 133 to authorize user device 101 for the requested session. User charging system 133 accesses user device 101's subscriber profile based on the MSISDN to authorize user device 101 for the requested session. For example, user device 101 may subscribe for a usage volume or usage time for the application session and if the requested usage time/volume is within the user device 101's subscription limit, charging system 133 may authorize user device 101. User charging system 133 authorizes user device 101 based on its subscriber profile and notifies application creation engine 131 of the authorization.

In response to both authorizations, application creation engine 131 transfers a load command to user charging system 133 to update user device 101's subscriber profile with the developer ID, application ID, and biller ID to track user device 101's usage of the application during the session. User charging system 133 writes the received data to the subscriber profile. Similarly, application creation engine 131 transfers a load command to developer charging system 134 to update the developer's profile with developer usage data. Application creation engine 131 tracks metrics like API call volume, network feature type, amount of network features, and the like to generate the developer usage data. Developer charging system 134 writes the received data to the developer profile. Developer charging system 134 generates a runtime usage Call Detail Record (CDR) based on the usage data and transfers the runtime CDR to developer computing system 140.

Application creation engine 131 transfers a feature command to core network 120 to serve the session for the application to user device 101 and to enable the one or more network features for the session requested by developer computing system 140. Core network 120 enables the one or more network features and serves user device 101. Core network 120 tracks session usage data (e.g., data volume, usage time, etc.) for user device 101. Core network 120 reports the session usage data to user charging system 133. User charging system 133 generates a data usage CDR and transfers the data usage CDR to billing system 160. Billing system 160 generates a monetary charge for the user of user device 101 based on the data usage CDR.

The runtime usage CDR characterizes usage of application creation engine 131 by the application developer. The data usage CDR characterizes network usage by user device 101. This bifurcation allows user device 101 and developer computing system 140 to be selectively billed for their respective network usage. The runtime and data usage CDRs comprise information like event ID, transaction timestamp, account ID, call partner ID, application ID, service ID, MSISDN, data consumption, session length, session start/end time, event type, customer Billing Account Number (BAN), customer name, channel, charge indicator, Netcracker partner ID, feature name, transaction ID, reason, rating group, and slice ID.

The event ID comprises a unique identifier for the CDR. The transaction timestamp comprises the date/time of the request. The account ID indicates user device 101's and/or developer computing system 140's billing account. The call partner ID comprises a unique identifier for developer computing system 140. The application ID comprises a unique identifier for the user application. The service ID comprises a unique identifier(s) for the network feature(s). The MSISDN comprises a unique identifier for user device 101. The data consumption parameter indicates the session's data volume. The session length parameter indicates how long the session lasted. The start/end time parameter indicates the data/time the session began and ended. The event type parameter specifies the interactions (e.g., API call type) between developer computing system 140 and application creation engine 131. The customer BAN and customer name identify billing system 160. The channel indicates the entity to be billed, typically either billing system 160 or developer computing system 140. The charge indicator specifies the session's monetary rate. The Netcracker partner ID is an optional parameter that describes billing system 160. The feature name parameter further describes the network features for the application. The transaction ID and reason are optional parameters that further describes the CDR. The rating group characterizes QoD service (when applied) for the application. The slice ID identifies the network slice(s) (when applied) for the application.

Figure 5:
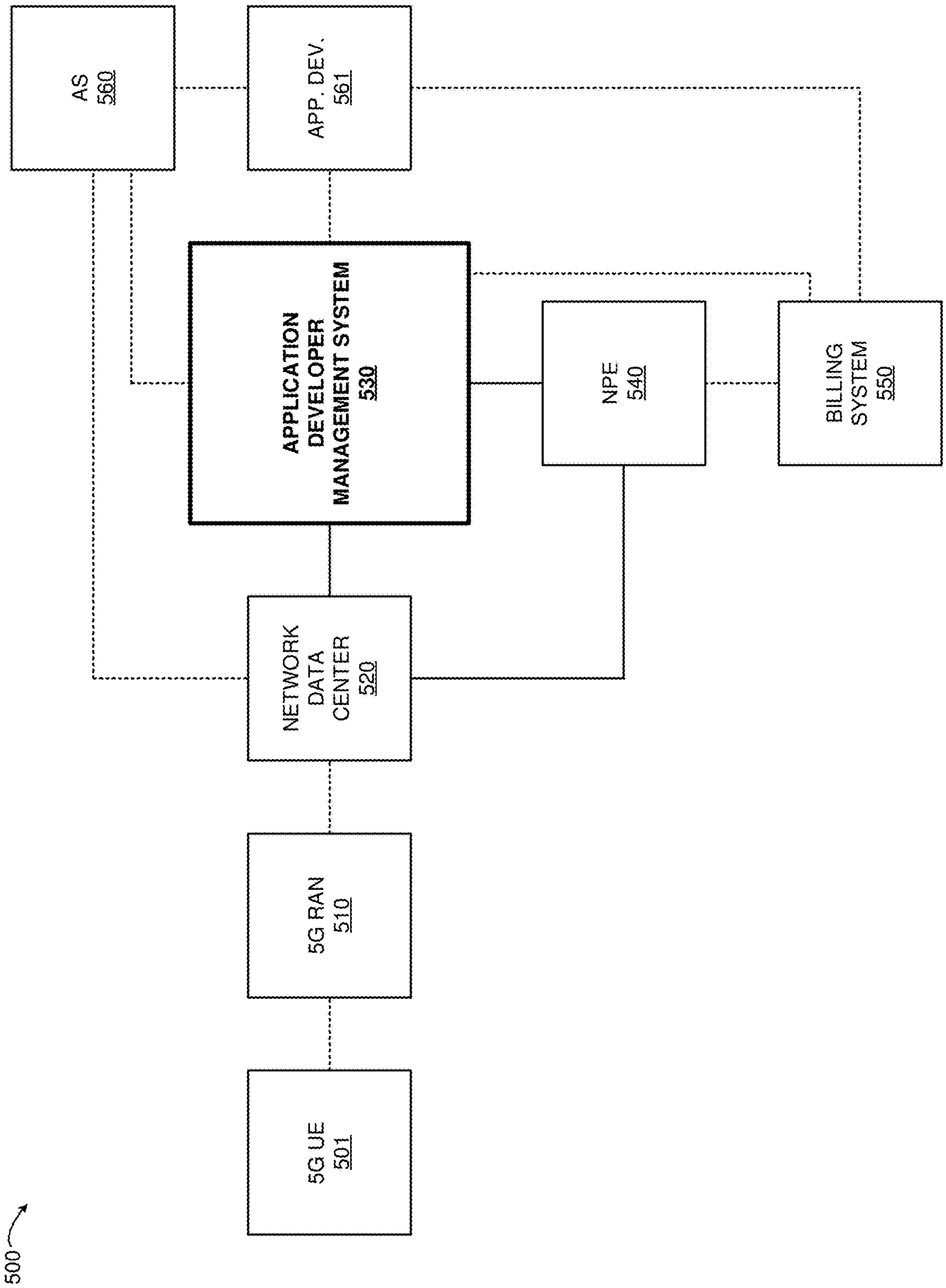
FIG. 5 illustrates an example Fifth Generation (5G) communication network to enable selective billing of application developers and end users.

FIG. 5 illustrates 5G communication network 500 to enable selective billing of application developers and end users. 5G communication network 500 comprises an example of communication network 100 illustrated in FIG. 1, however communication network 100 may differ. 5G communication network 500 comprises User Equipment (UE) 501, 5G RAN 510, network data center 520, application developer management system 530, Network Provisioning Engine (NPE) 540, billing system 550, Application Server (AS) 560, and application developer (APP.DEV.) 561. In other examples, 5G communication network 500 may comprise different or additional elements than those illustrated in FIG. 5.

Figure 6:
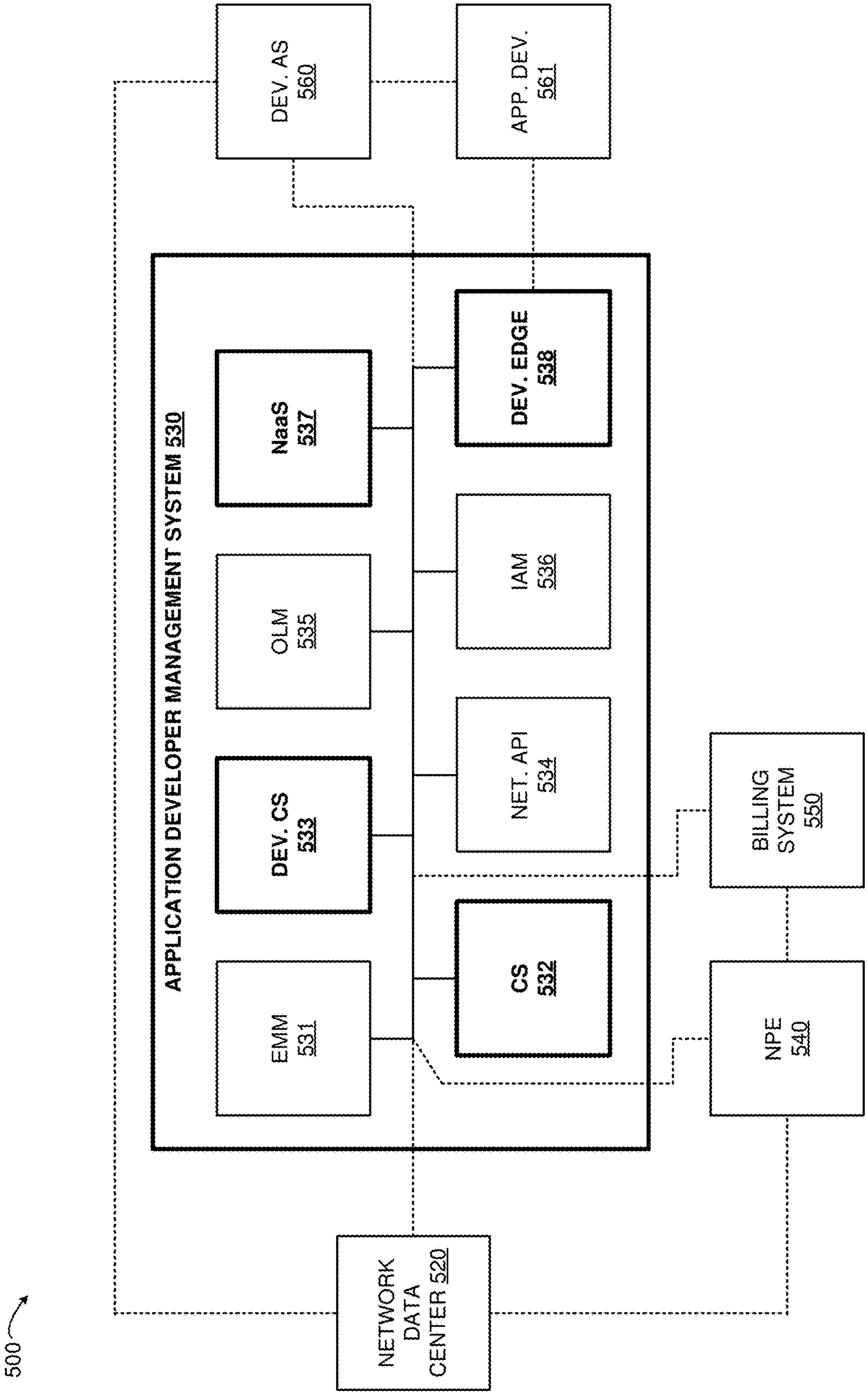
FIG. 6 further illustrates the example 5G communication network to enable selective billing of application developers and end users.

FIG. 6 further illustrates 5G communication network 500. Application developer management system 530 comprises an example of application developer management system 130 illustrated in FIG. 1, however application developer management system 130 may differ. Application developer management system 530 comprises Mediator (EMM) 531, Charging System (CS) 532, developer CS 533, network (NET.) API 534, Online Manager (OLM) 535, Identity and Access Management (IAM) 536, Network-as-a-Service (NaaS) 537, and developer (DEV.) edge 538. Other network functions and network entities are typically present in application developer management system 530 but are omitted for clarity.

Figure 7:
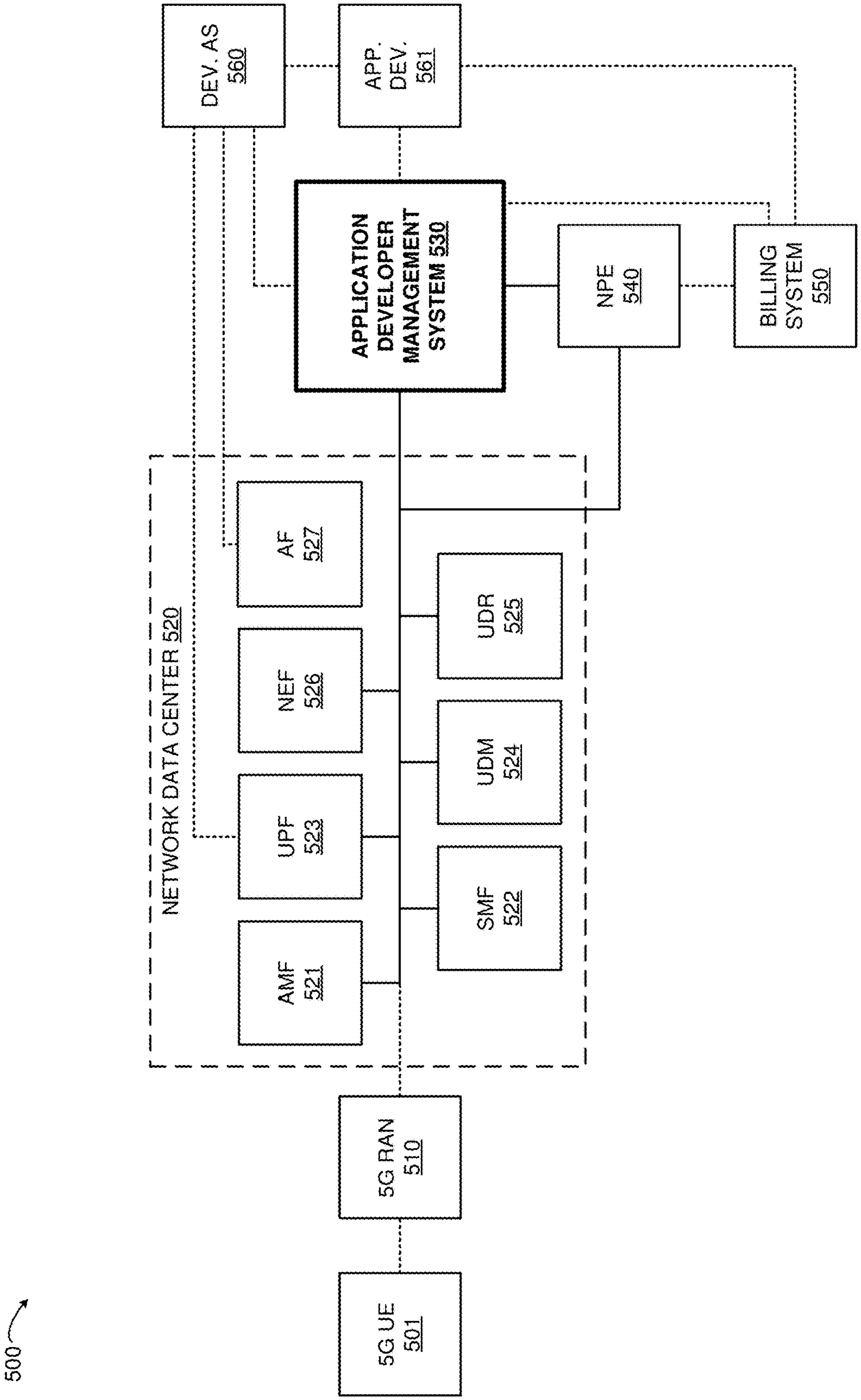
FIG. 7 further illustrates the example 5G communication network to enable selective billing of application developers and end users.

FIG. 7 further illustrates 5G communication network 500. Network data center 520 comprises an example of core network 120 illustrated in FIG. 1, however core network 120 may differ. Network data center 520 comprises Access and Mobility Management Function (AMF) 521, Session Management Function (SMF) 522, User Plane Function (UPF) 523, Unified Data Management (UDM) 524, Unified Data Registry (UDR) 525, Network Exposure Function (NEF) 526, and Application Function (AF) 527. Other network functions and network entities like Authentication Server Function (AUSF), Policy Control Function (PCF), Network Slice Selection Function (NSSF), Charging Function (CHF), Home Subscriber Register (HLR), Home Subscriber Server (HSS), Network Repository Function (NRF), Short Message Service Function (SMSF), Equipment Identity Register (EIR), and Session Communication Proxy (SCP) are typically present in network data center 520 but are omitted for clarity.

Now referring to FIGS. 5-7, in some examples, application developer 561 buys access to various network APIs through developer edge 538 to build a user application. Application developer 561 transfers a developer registration request to developer edge 538. The request indicates the purchased APIs to build an application available for UEs on 5G communication network 500. Developer edge 538 assigns a developer ID to application developer 561 and indicates the developer ID and API purchases to NaaS 537. NaaS 537 directs NPE 540 to provision application developer 561 for application building services. NPE 540 loads developer CS 533 and IAM 536 with the developer ID and network codes that correspond to the purchased APIs. NPE 540 notifies developer edge 538 over NaaS 537 that application developer 561 is provisioned. In response, developer edge 538 registers application developer 561 and transfers a registration approval message to application developer 561.

Application developer 561 interfaces with NaaS 537 to build a user application hosed on AS 560 for UEs on 5G communication network 500. Application developer 561 transfers API calls to NaaS 537 to select network features to build the application. Exemplary network features include QoS level, QoD service, slice types, latency, throughput, geographic requirements, and the like. For example, if the application created by application developer 561 and hosted by AS 560 is an XR conferencing application, application developer 561 may transfer API calls for an XR slice type, priority QoS, low-latency, high-throughput, and QoD enablement. NaaS 537 receives the API calls from AS 560 and interfaces with NPE 540 to enable the requested network services for the application. NPE 540 loads service attributes to UDR 525, CS 532, developer CS 533, IAM 536, and/or other network nodes to enable the requested network features for the application.

Once the user application is built, application developer 561 transfers an API call to developer edge 538 to register the application. The API call includes an application registration request and lists the network features selected for the application. Developer edge 538 notifies NaaS 537. NaaS 537 generates an application ID for the application and registers the application on 5G communication network 500. NaaS 537 indicates the application ID to application developer 561 over developer edge 538. Application developer 561 selects a billing scheme for use of the application on 5G communication network 500. Application developer 561 provides the application ID and network features for the application to developer edge 538 and billing system 550. Typically, the billing scheme comprises either user billing or developer billing. When user billing is selected, application developer 561 notifies developer edge 538, and 5G communication network 500 routes charges for end-user (e.g., UE 501) use of the application to billing system 550. When developer billing is selected, application developer 561 notifies developer edge 538, and 5G communication network 500 exposes charges for end-user use of the application to application developer 561 over developer edge 538.

When UE 501 first joins 5G communication network 500 (e.g., via initial purchase) or when UE 501 updates its subscription on 5G communication network 500 (e.g., new service purchase), NPE 540 provisions UE 501 for service on 5G communication network 500. In response to an initial or new service purchase, billing system 550 transfers a provisioning request to NPE 540. Billing system 550 is associated with UE 501 based on subscription type (e.g., postpaid, prepaid, enterprise, etc.). 5G communication network 500 typically comprises many more billing systems for the various subscriber types, however only the billing system for UE 501's subscription type is illustrated for clarity. The request comprises the MSISDN of UE 501, a rate plan, and billing codes for services (e.g., voice calling, internet access, etc.) on 5G communication network 500. In this example, the user of UE 501 purchases a subscription that includes service for the user application hosted by AS 560 and created by application developer 561. As such, the billing codes included in the request indicate the application ID of the user application and the network features selected for the application. These billing codes are referred to as Customer Facing Services (CFSs).

NPE 540 receives the request and accesses a provisioning catalog to translate the transaction type and CFSs for the brand/service type of billing system 550 into network node types (referred to as Resource Facing Specification (RFS)) and address value pairs (referred to as Logical Resource Specification (LRS)). The RFS defines the network functions/entities in 5G communication network 500 where the transaction is to occur. The LRS defines the service attributes in the RFS that are to be updated (e.g., billing rate, user application authorization, network features, etc.). NPE 540 generates a provisioning update that includes the LRSs and identifies UE 501 by MSISDN. NPE 540 transfers the updates to network functions/entities in 5G communication network 500 based on the RFSs. The RFSs typically identify CS 532 and IAM 536 as well as network functions in network data center 520 like UDM 524 and UDR 525. CS 532 and IAM 536 store subscriber profiles for UE 501. CS 532 and IAM 536 receive provisioning updates that identify UE 501 by MSISDN and that include LRSs for a billing rate, application ID for the user application, and authorized network features for the user application. CS 532 and IAM 536 identify UE 501's subscriber profile by MSISDN and responsively write the received LRSs to the profile to implement the provisioning update. The provisioning update authorizes UE 501 to use the user application hosted by AS 560 and to authorize the network feature for the user application. Other network functions/entities identified by the RFSs (e.g., UDR 525) receive the provisioning updates and write the LRSs included in the updates to corresponding subscriber profiles stored/managed by the network functions/entities.

Once provisioned, UE 501 downloads the user application created by application developer 561 and hosted by AS 560. For example, UE 501 may download the user application from AS 560 via a WiFi link. The application may comprise a media broadcasting application, XR application, video conferencing application, autonomous driving application, voice calling application, text messaging application, online gaming application, and the like. UE 501 may download a local client of the user application while AS 560 may host the server-side software components of the user application.

UE 501 wirelessly attaches to 5G RAN 510 over a 5GNR link. UE 501 transfers a registration request to AMF 521 over 5G RAN 510. The registration request indicates a registration type, subscriber IDs, slice requests, UE capabilities, a PDU session request for the user application hosted by AS 560, and the like. For example, the registration request may invoke the user application by including the application ID in the request. In response to the registration request, AMF 521 interfaces with other network functions like UDM 524 to authenticate UE 501. Authentication entails providing a random number challenge to UE 501 and authenticating UE 501 when the authentication result generated by UE 501 matches an expected result. Responsive to the authentication, AMF 521 interfaces with UDM 524 retrieve subscriber data (e.g., authorized QoS, allowed slices, latency, throughput, etc.) for UE 501. UDM 524 accesses the subscriber profile for UE 501 stored by UDR 525 and returns the requested data. AMF 521 forms UE context for UE 501 using the retrieved data. The UE context defines the authorized services for UE 501.

AMF 521 selects SMF 522 to serve UE 501 based on the UE context. AMF 521 directs SMF 522 to establish a PDU session for UE 501 for the user application. AMF 521 indicates the application ID of the user application and the MSISDN of UE 501 to SMF 522. SMF 522 acknowledges the request and initiates PDU session authorization. SMF 522 transfers a session authorization request that includes the application ID and MSISDN of UE 501 to NEF 526. NEF 526 exposes the request to AS 560 over AF 527. In response, AS 560 transfers an API call to NaaS 537 to enable the network features purchased by application developer 561 for the application for UE 501's PDU session. The API call comprises UE 501's MSISDN, the application ID for the user application, the network features selected for the application, the IP address of AS 560, and a requested usage amount (e.g., data amount, time amount, etc.). NaaS 537 indicates the application ID and requested features to IAM 536. IAM 536 identifies the provisioned features for the user application based on the application ID and compares the requested features to the provisioned features to authorize the application. IAM 536 authorizes the application when the requested features match the provisioned features. IAM 536 notifies NaaS 537 of the successful authorization. In contrast, when the requested features do not match the provisioned features, IAM 536 does not authorize the application and directs NaaS 537 to block the request.

NaaS 537 indicates the requested session usage to CS 532. The requested session usage may comprise a data amount, a time, and/or combination thereof. For example, AS 560 may request five hours of enhanced service of the user application for UE 501. CS 532 accesses UE 501's subscriber profile to determine if UE 501 is authorized for the requested session usage. For example, the subscriber profile may comprise data volume and time duration limits and may track data/time usage by UE 501. If UE 501 does not have available data/time for the requested session, CS 532 directs NaaS 537 to cancel the session. If UE 501 has available data/time for the requested session, CS 532 directs NaaS 537 to approve the session.

NaaS 537 tracks runtime/API usage by AS 560/application developer 561. NaaS 537 indicates the usage of NaaS 537 by AS 560/application developer 561 as well as information like application ID, developer ID, approved network features, AS 560 IP address, and biller ID for the requested session to OLM 535. The biller ID is based on the billing scheme selected by application developer 561 and indicates if the end subscriber (i.e., UE 501) or application developer 561 is to be billed for the PDU session (i.e., the front-end use of the application). When the UE 501 is to be billed, the biller ID indicates billing system 550. When application developer 561 is to be billed, the biller ID indicates application developer 561. OLM 535 translates the signaling used by NaaS 537 into a format interpretable by CS 532 and developer CS 533. OLM 535 loads the developer ID, application ID, feature list, IP address, and biller ID to CS 532. OLM 535 loads the developer ID, features, and runtime usage data to developer CS 533. NaaS 537 directs SMF 522 to approve the PDU session for UE 501 over network API 534. NaaS 537 directs SMF 522 (and/or other network nodes like AMF 521, UDM 524, 5G RAN 510, etc.) to enable the requested network features for the PDU session over network API 534. For example, network API 534 may comprise a KONA API to serve as an interface between NaaS 537 and the network functions in network data center 520.

SMF 522 receives the approval message and the network feature indication from NaaS 537 via network API 534. SMF 522 allocates IP addresses and a Tunnel Endpoint ID (TEID) for the session. SMF 522 selects UPF 523 to serve the PDU session based on the network features. Typically, 5G communication network comprises many more UPFs with varying capabilities and network slice assignments. For example, SMF 522 may select a UPF (i.e., UE 523) with capabilities to support the slice type, throughput, latency, and QoS enabled for the PDU session of the user application. SMF 522 generates session context that includes the IP address and TEID. SMF 522 notifies AMF 521 of the successful session creation and provides the session context to AMF 521. AMF 521 adds the session context to the UE context. In response, AMF 521 registers UE 501 for service on network data center 520. AMF 521 generates a registration accept message that includes the UE context and/or other information for UE 501 to begin its PDU session on 5G communication network 500. AMF 521 configures 5G RAN 510 to serve the PDU session to UE 501 and transfers the registration accept message to UE 501 over 5G RAN 510.

UE 501 uses the context included in the registration approval message to begin the PDU session. The client-side component of the user application hosted by UE 501 generates uplink data and transfers the uplink data to UPF 523 over 5G RAN 510. UPF 523 transfers the uplink data to AS 560. Likewise, the server-side component of the user application in AS 560 generates downlink data for the PDU session. AS 560 transfers the downlink data to UPF 523. UPF 523 delivers the downlink data to UE 501 over 5G RAN 510. AMF 521, SMF 522, and UPF 523 interface to enable the network features for the application. For example, UPF 523 may exchange the data below a latency threshold set by the network features, above a throughput threshold set by the network features, at a QoS set by the network features, and/or the like. SMF 522 monitors the PDU session to track usage (i.e., time amount and/or data amount) by UE 501. SMF 522 reports the usage to CS 532.

CS 532 generates a data usage CDR that includes the data usage for the PDU session between UE 501 and AS 560. CS 532 transfers the data usage CDR as well as the information loaded to CS 532 by OLM 535 for the session (e.g., developer ID, application ID, network features, IP address, and biller ID) to EMM 531. Similarly, developer CS 533 generates a runtime usage CDR that includes the runtime/API usage of AS 560/application developer 561 tracked by NaaS 537 as well as the information loaded to developer CS 533 by OLM 535 (e.g., selected features and developer ID). Developer CS 533 reports the runtime usage CDR to EMM 531. EMM 531 receives the data usage CDR, runtime usage CDR, and the other information. EMM 531 transfers the runtime usage CDR to developer edge 538. When the developer ID is included in the information received from CS 532, EMM 531 determines the data usage CDR needs to be routed to developer edge 538. In response, EMM 531 loads the data usage CDR with the information received from CS 532 to generate an enriched data usage CDR and routes the enriched data usage CDR to developer edge 538. When the developer ID is not included, EMM 531 forgoes data usage CDR enrichment and delivers the data usage CDR to billing system 550.

Developer edge 538 receives the runtime usage CDR and the enriched data usage CDR. Developer edge 538 reads the biller ID included in the runtime usage CDR to determine the billing scheme selected by application developer 561. When the biller ID identifies application developer 561, developer edge 538 decides to bill application developer 561 for the data usage by UE 501. Developer edge 538 exposes the runtime usage CDR and the enriched data usage CDR to application developer 561 to bill for the session and API usage. When the biller ID identifies billing system 550, developer edge 538 decides to bill the user of UE 501 for the data usage by UE 501. Developer edge 538 exposes the runtime usage CDR to application developer 561 to bill for the API usage and exposes the enriched data usage CDR to billing system 550 to bill the user of UE 501 for the data usage. Billing system 550 bills the user of UE 501 based on the enriched data usage CDR.

Figure 8:
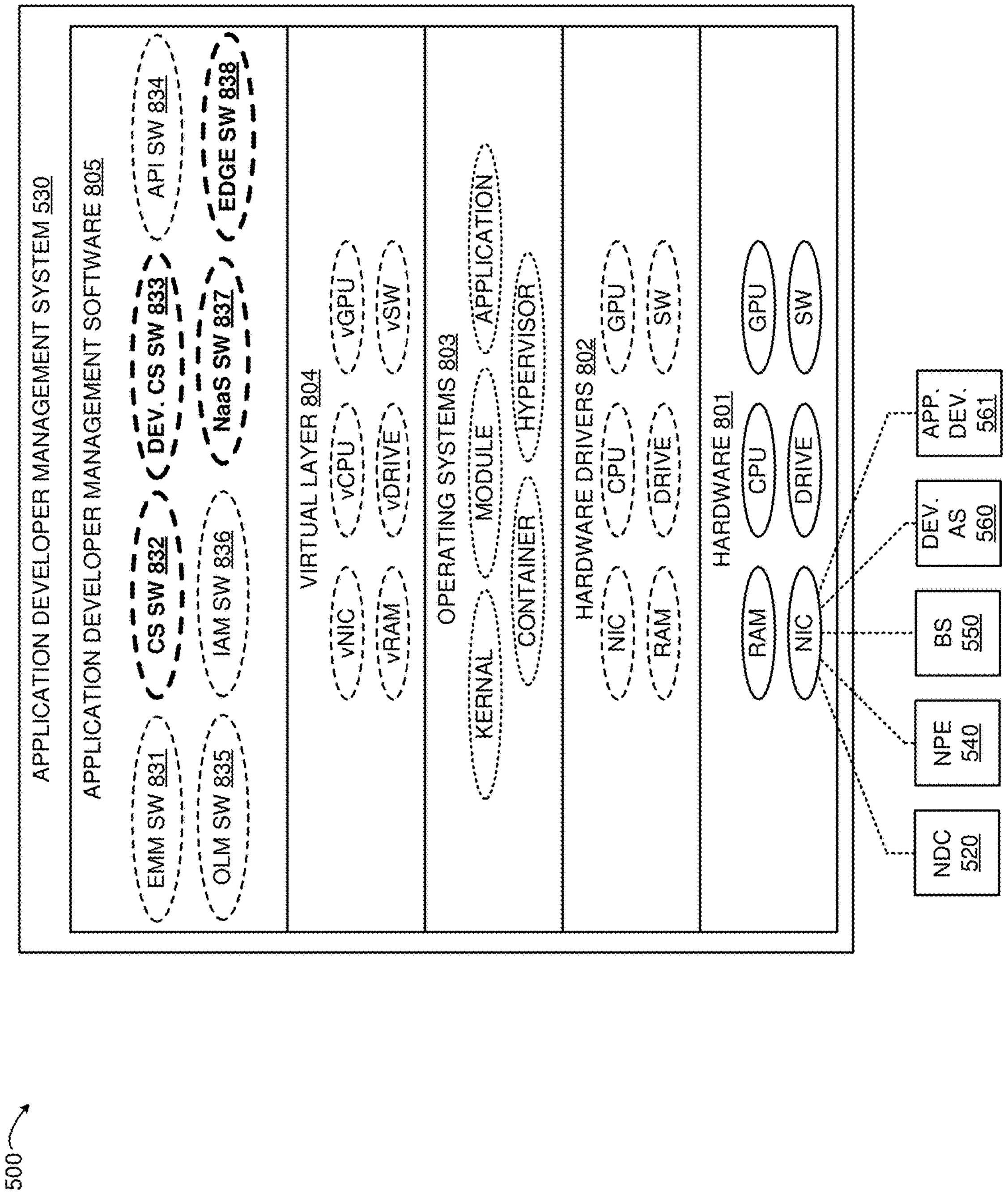
FIG. 8 illustrates an example application developer management system in the 5G communication network to enable selective billing of application developers and end users.

FIG. 8 further illustrates application developer management system 530 in 5G communication network 500. Application developer management system 530 utilizes a virtualized computing architecture like NFVI, however application developer management system 530 may utilize a different type of computing architecture in other examples. Application developer management system 530 comprises hardware 801, hardware drivers 802, operating systems 803, virtual layer 804, and application developer management system software 805. Hardware 801 comprises Network Interface Cards (NICs), CPU, GPU, RAM, Flash/Disk Drives (DRIVE), and Data Switches (SW). Hardware drivers 802 comprise software that is resident in the NIC, CPU, GPU, RAM, DRIVE, and SW. Operating systems 803 comprise kernels, modules, applications, containers, hypervisors, and the like. Virtual layer 804 comprises vNIC, vCPU, vGPU, vRAM, vDRIVE, and vSW. Application developer management system software 805 comprises EMM Software (SW) 831, CS SW 832, developer CS SW 833, API SW 834, OLM SW 835, IAM SW 836, NaaS SW 837, and EDGE SW 838. Additional software is typically present but is omitted for clarity. Application developer management system 530 may be located at a single site or be distributed across multiple geographic locations. The NIC in hardware 801 is coupled to network data center (NDC) 520, NPE 540, billing system (BS) 550, AS 560, application developer 561, and to external systems (not illustrated). Hardware 801 executes hardware drivers 802, operating systems 803, virtual layer 804, and application developer management system software 805 to form EMM 531, CS 532, developer CS 533, network API 534, OLM 535, IAM 536, NaaS 537, and developer edge 538.

Figure 9:
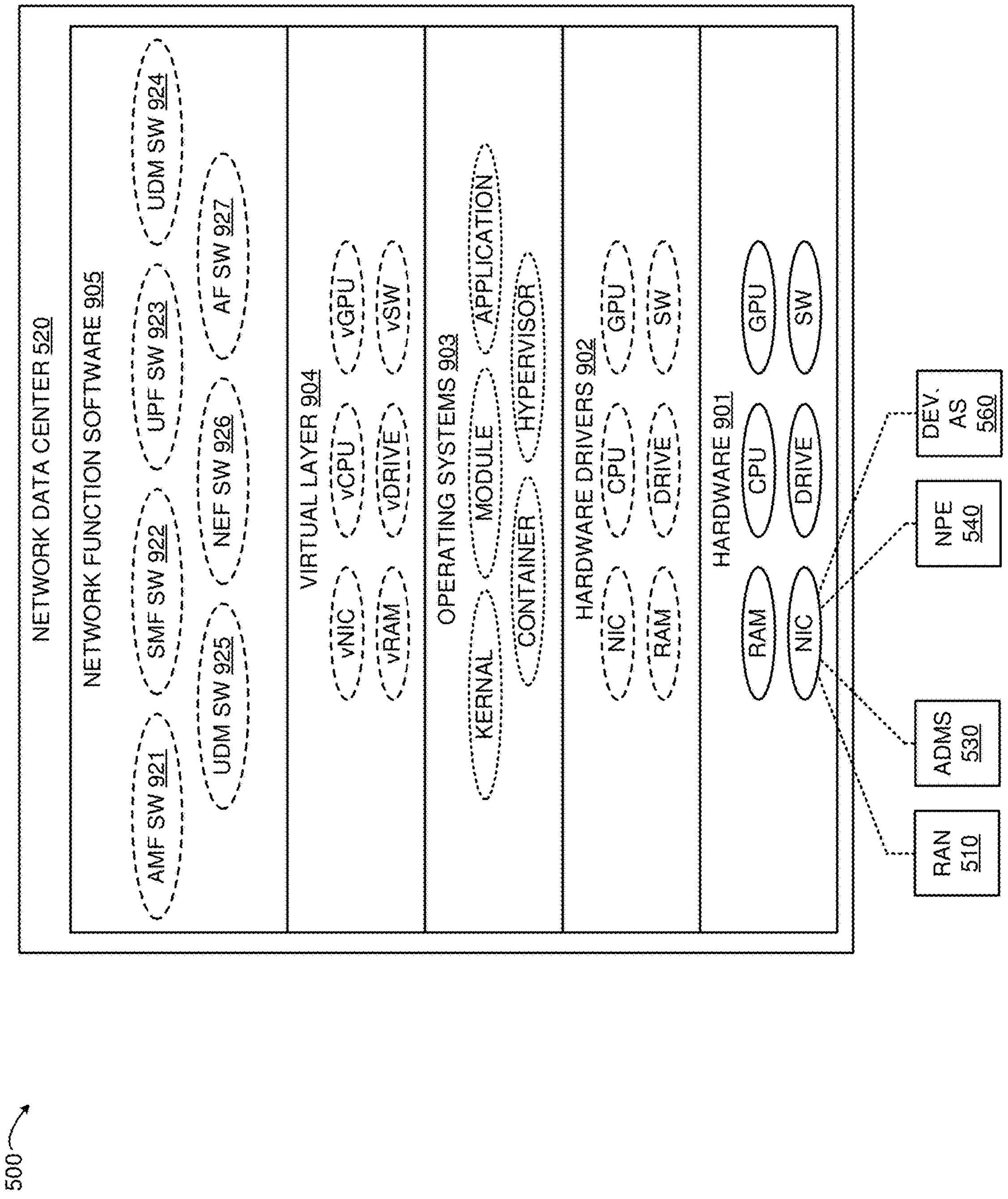
FIG. 9 illustrates an example network data center in the 5G communication network to enable selective billing of application developers and end users.

FIG. 9 further illustrates network data center 520 in 5G communication network 500. Network data center 520 utilizes a virtualized computing architecture like NFVI, however network data center 520 may utilize a different type of computing architecture in other examples. Network data center 520 comprises hardware 901, hardware drivers 902, operating systems 903, virtual layer 904, and network function software 905. Hardware 901 comprises Network Interface Cards (NICs), CPU, GPU, RAM, Flash/Disk Drives (DRIVE), and Data Switches (SW). Hardware drivers 902 comprise software that is resident in the NIC, CPU, GPU, RAM, DRIVE, and SW. Operating systems 903 comprise kernels, modules, applications, containers, hypervisors, and the like. Virtual layer 904 comprises vNIC, vCPU, vGPU, vRAM, vDRIVE, and vSW. Network function software 905 comprises AMF SW 921, SMF SW 922, UPF SW 923, UDM SW 924, UDR SW 925, NEF SW 926, and AF SW 927. Additional network function software for network functions like AUSF, PCF, NSSF, CHF, HLR, HSS, NRF, SMSF, EIR, and SCP is typically present but is omitted for clarity. Network data center 520 may be located at a single site or be distributed across multiple geographic locations. The NIC in hardware 901 is coupled to 5G RAN 510, application developer management system (ADMS) 530, NPE 540, AS 560, and to external systems (not illustrated). Hardware 901 executes hardware drivers 902, operating systems 903, virtual layer 904, and network function software 905 to form AMF 521, SMF 522, UPF 523, UDM 524, UDR 525, NEF 526, and AF 527. While network data center 520 and application developer management system 530 are illustrated as comprising separate virtualized computing systems, in some examples network data center 520 and application developer management system 530 may share a virtualized computing system.

Figure 10:
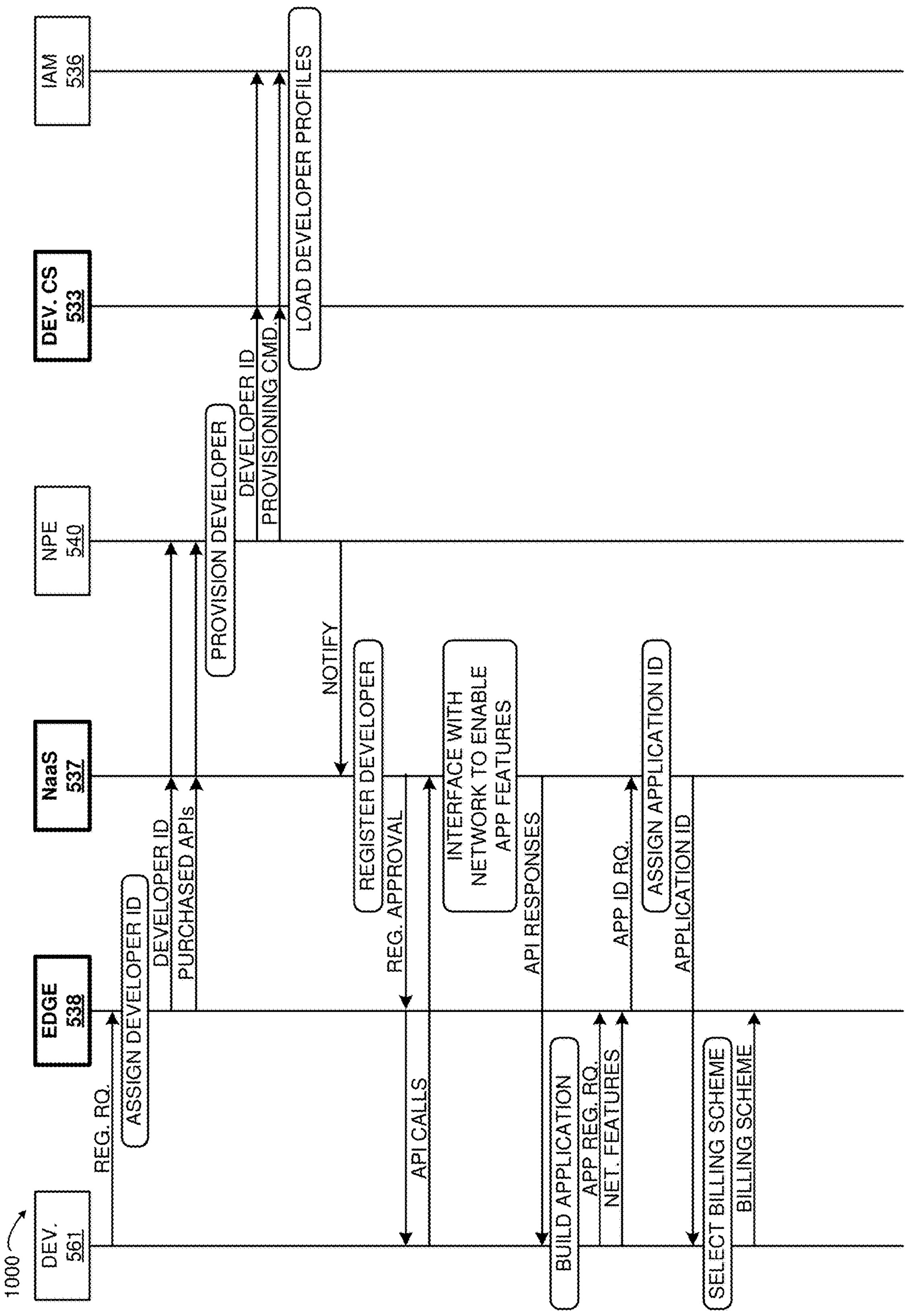
FIG. 10 illustrates an example operation of the 5G communication network to onboard an application developer and create an application.
Figure 11:
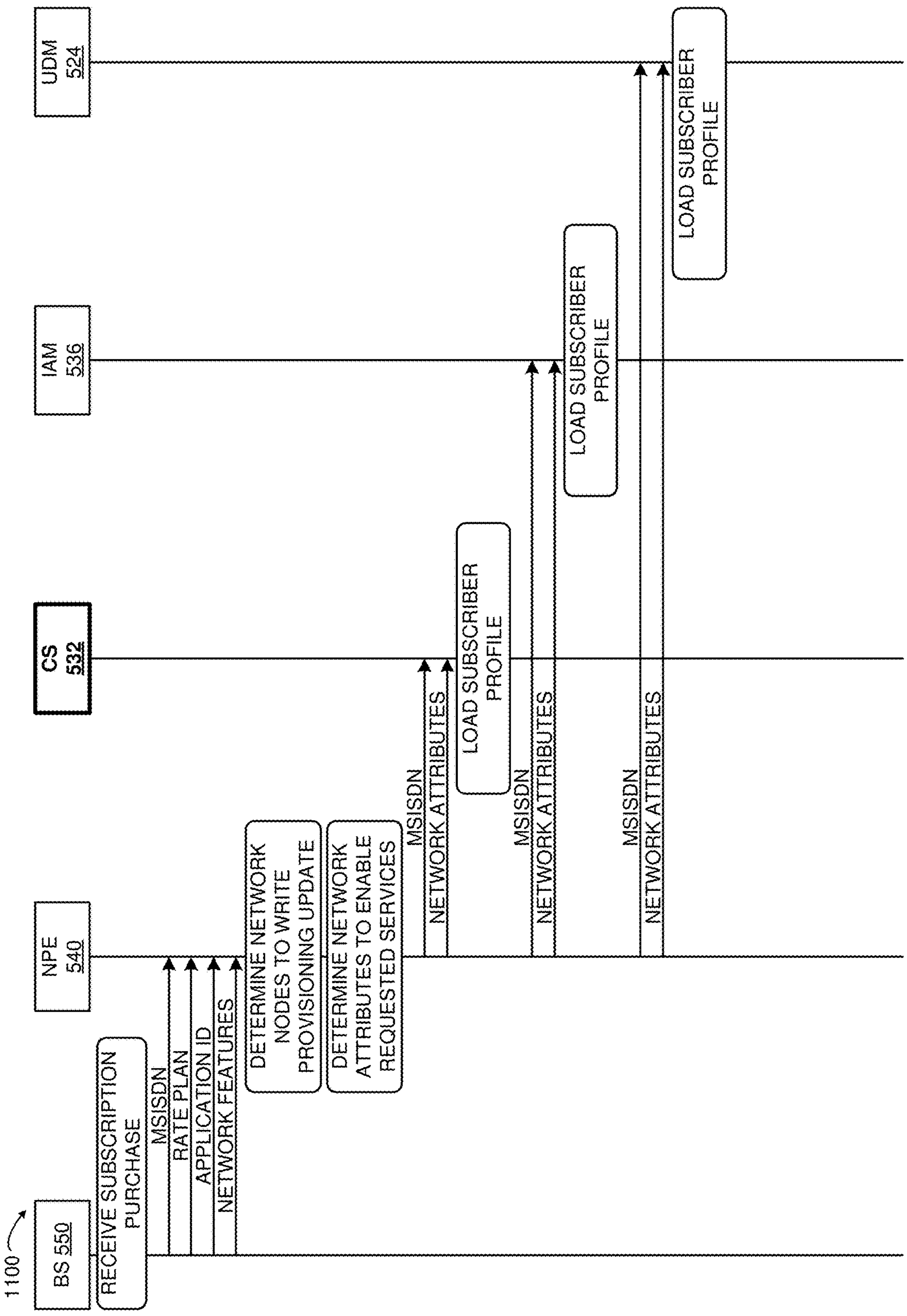
FIG. 11 illustrates an example operation of the 5G communication network to provision a user device.
Figure 12:
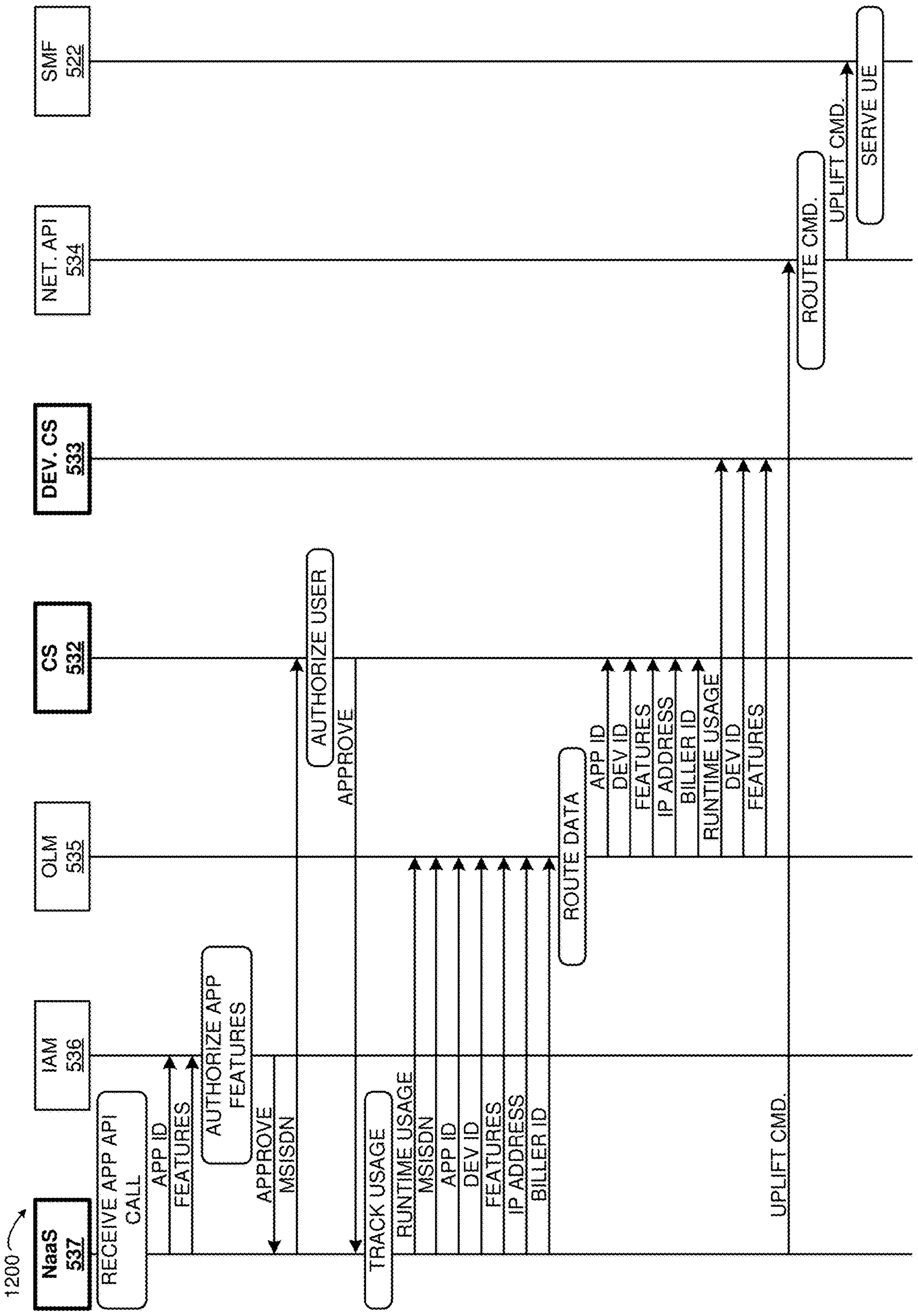
FIG. 12 illustrates an example operation of the 5G communication network to enable network features for a session of a user device.
Figure 13:
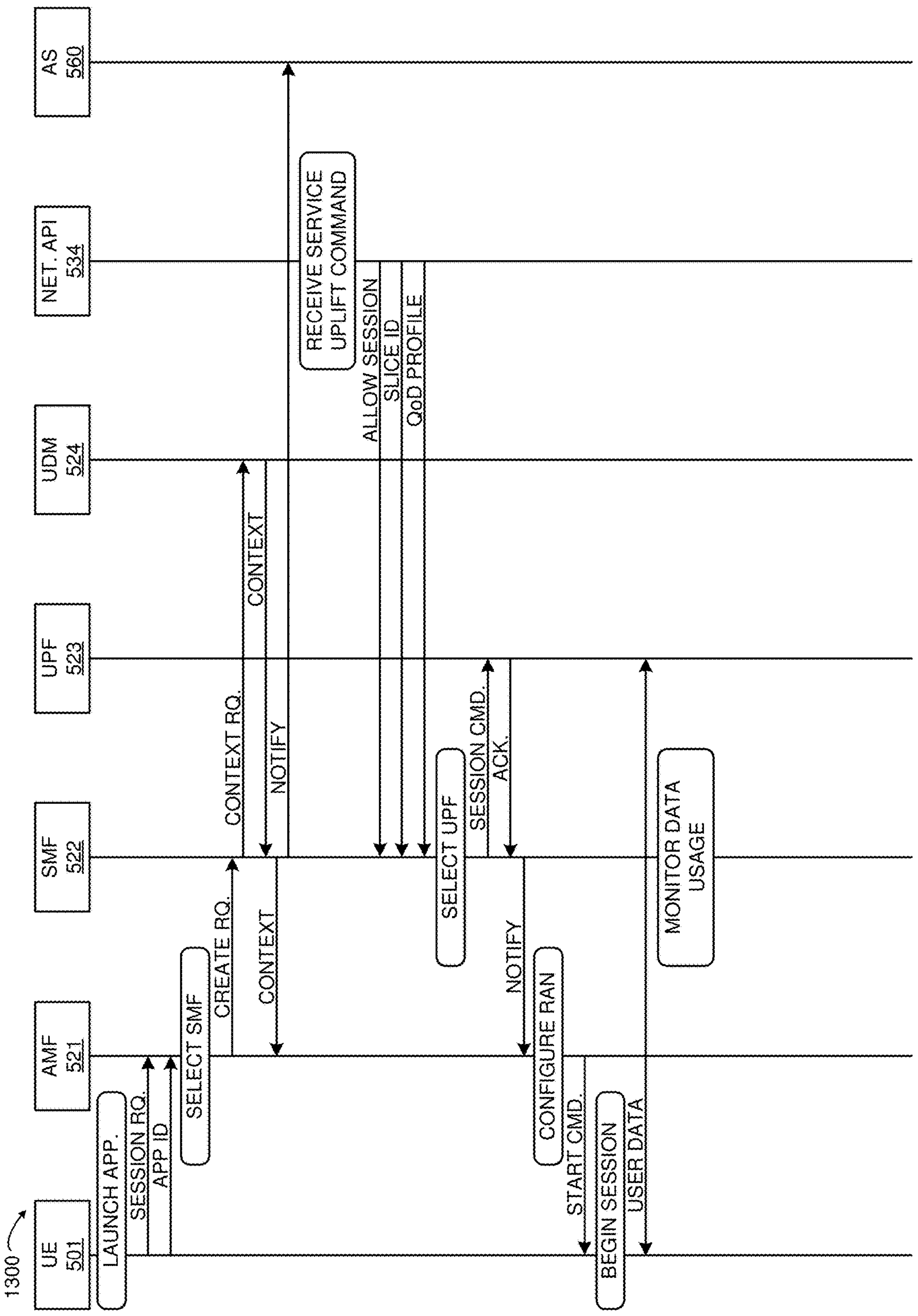
FIG. 13 illustrates an example operation of the 5G communication network to serve a session to a user device.
Figure 14:
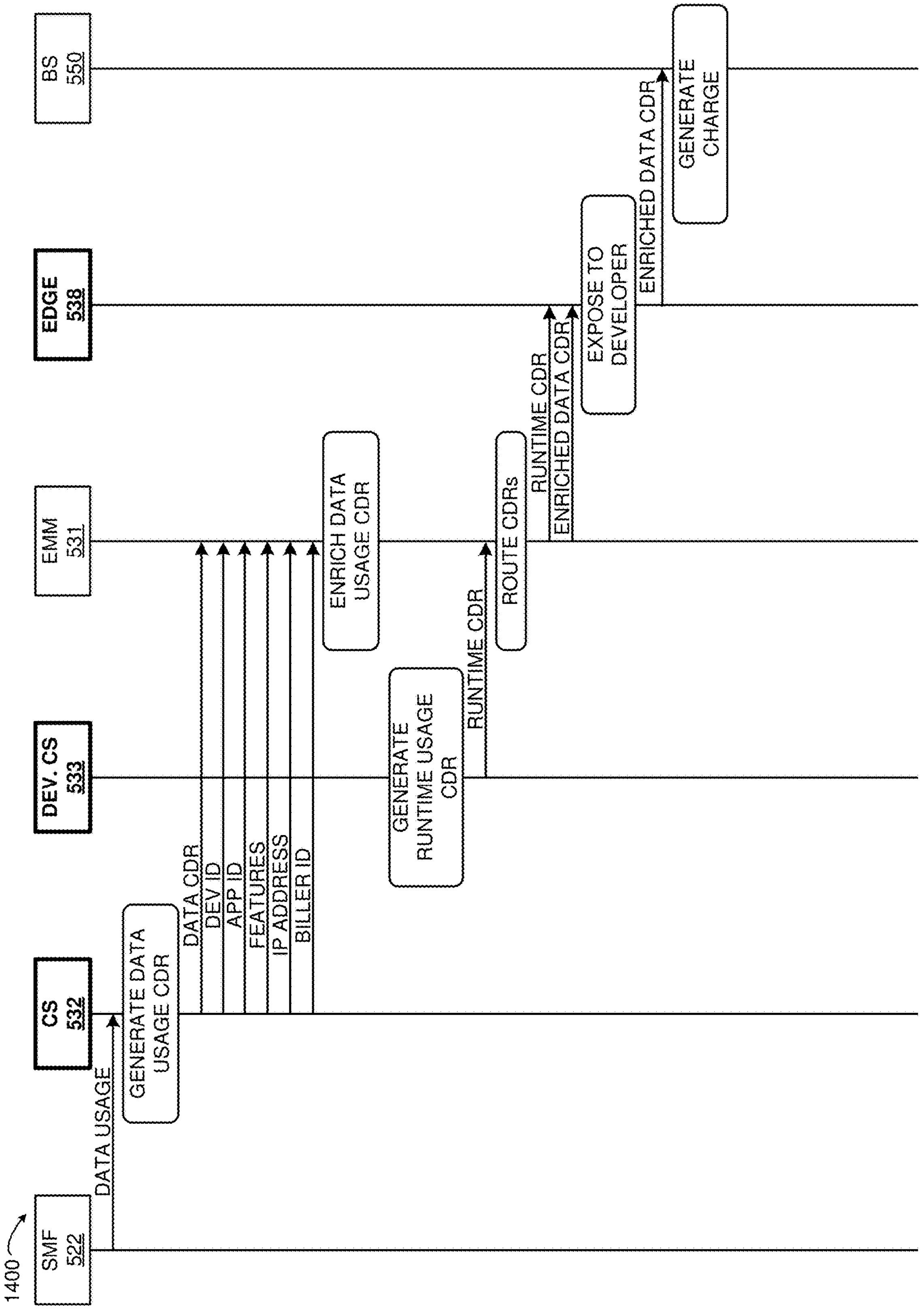
FIG. 14 illustrates a first example operation of the 5G communication network to selectively bill an application developer and an end user.

FIGS. 10-14 illustrate exemplary operations of 5G communication network 500 to enable selective billing of application developers and end users. FIG. 10 illustrates process 1000. Process 1000 comprises an exemplary operation of 5G communication network 500 to onboard an application developer and create an application. FIG. 11 illustrates process 1100. Process 1100 comprises an exemplary operation of 5G communication network 500 to provision a user device. FIG. 12 illustrates process 1200. Process 1200 comprises an exemplary operation of 5G communication network 500 to enable network features for a session of a user device. FIG. 13 illustrates process 1300. Process 1300 comprises an exemplary operation of 5G communication network 500 to serve a session to a user device. FIG. 14 illustrates process 1400. Process 1400 comprises an exemplary operation of 5G communication network 500 to selectively bill an application developer and an end user. Processes 1000, 1100, 1200, 1300, and 1400 comprise examples of processes 200, 300, and 400 illustrated in FIGS. 2-4, however processes 200, 300, and 400 may differ. In other examples, processes 1000, 1100, 1200, 1300, and 1400 may differ.

Now referring to FIG. 10, in some examples, application developer 561 purchases access to APIs for QoD video calling and network slicing to build a video conferencing user application to be hosted on AS 560 and to be made available to UEs on 5G communication network 500. Application developer 561 transfers a developer registration request that indicates the QoD video calling and network slicing APIs to developer edge 538. Developer edge 538 assigns a developer ID to application developer 561 and indicates the developer ID and purchased APIs to NaaS 537. NaaS 537 indicates the developer ID and the purchased APIs to NPE 540. NPE 540 provisions application developer 561 to authorize application creation and access to the purchased APIs. NPE 540 transfers the developer ID and provisioning commands to developer CS 533 and IAM 536. Developer CS 533 and IAM 536 load developer profiles managed by developer CS 533 and IAM 536 with the developer ID and network codes that correspond to the video calling QoD API and the network slicing API. NPE 540 notifies developer edge 538 over NaaS 537 that application developer 561 is provisioned. In response, developer edge 538 registers application developer 561 and transfers a registration approval message to application developer 561 over developer edge 538.

Application developer 561 transfers API calls to NaaS 537 to request QoD video calling and access to an URLLC slice for the video calling application. NaaS 537 receives the API calls from AS 560 and interfaces with network data center 520 and/or NPE 540 to enable QoD video calling API and URLLC slice API access for application developer 561. NaaS 537 transfers API responses enabling the requested network features. Application developer 561 builds the video calling application to utilize QoD video calling and the URLLC slice provided by 5G communication network 500 and hosts the server-side components of the video application on AS 560.

Once the user application is built, application developer 561 transfers an application registration request and indicates the network features selected for the application to developer edge 538. Developer edge 538 notifies NaaS 537. NaaS 537 generates an application ID for the application and registers the application on 5G communication network 500. NaaS 537 indicates the application ID to application developer 561 over developer edge 538. Application developer 561 selects a billing scheme for use of the application on 5G communication network 500. In this example, application developer 561 elects to bill the end-user for use of the application.

Now referring to FIG. 11, in some examples, the user of UE 501 purchases access to the video calling application hosted by AS 560. Billing system 550 processes the purchase and indicates the MSISDN, rate plan, application ID, and CFSs for QoD video calling and URLLC slice access to NPE 540. NPE 540 translates the MSISDN, rate plan, application ID, and CFSs into RFSs for CS 532, IAM 536, and UDM 524 and LRSs for QoD video calling and URLLC slice access. NPE 540 generates a provisioning update that includes the LRSs (e.g. network attributes) and that identifies UE 501 by MSISDN. NPE 540 transfers the updates to CS 532, IAM 536, and UDM 524. CS 532, IAM 536, and UDM 524 store/manage subscriber profiles for UE 501. CS 532, IAM 536, and UDM 524 receive provisioning updates that identify UE 501 by MSISDN and that include the LRSs. CS 532, IAM 536, and UDM 524 identify UE 501's subscriber profile (as stored on UDR 525) by MSISDN and responsively write the received LRSs to the profile to implement the provisioning update and authorize UE 501 for QoD video calling and URLLC slice access when using the video calling application hosted by AS 560.

Now referring to FIG. 12, in some examples, NaaS 537 receives an API call transferred by AS 560 to uplift service for UE 501 in response to UE 501 launching the video calling application. The API call comprises UE 501's MSISDN, the application ID for the video calling application, a video calling QoD request, a URLLC slice request, and the IP address of AS 560. NaaS 537 indicates the application ID, video calling QoD request, and URLLC slice request to IAM 536. IAM 536 determines the video calling application is provisioned for video calling QoD service and URLLC slice access and responsively authorizes the requested network features. IAM 536 notifies NaaS 537 of the successful authorization. NaaS 537 indicates the MSISDN for UE 501 to CS 532. CS 532 accesses UE 501's subscriber profile and determines UE 501's account has a sufficient balance for the requested session. CS 532 notifies NaaS 537 that the request for UE 501 is approved.

NaaS 537 tracks runtime/API usage by AS 560. NaaS 537 indicates the runtime usage, MSISDN, application ID, developer ID, video calling QoD feature, URLLC slice feature, AS 560's IP address, and biller ID for application developer 561 to OLM 535. OLM 535 translates signaling used by NaaS 537 into a format interpretable by CS 532 and developer CS 533 and routes the data to the intended endpoint. OLM 535 loads the developer ID, application ID, feature list, IP address, and biller ID to CS 532. OLM 535 loads the developer ID, features, and runtime usage data to developer CS 533. NaaS 537 transfers a service uplift command to network API 534 to enable QoD service and URLLC slice access. The command indicates the PDU session is allowed and comprises the video calling QoD profile and slice ID for the URLLC slice. The video calling QoD profile includes latency, throughput, and QoS settings for the PDU session as well as a time (and/or data) duration the latency, throughput, and QoS settings are to be enabled. Network API 534 routes the command to SMF 522. SMF 522 controls UPF 523 to enable QoD service and URLLC slice access for the PDU session to serve UE 501.

Now referring to FIG. 13, in some examples, UE 501 launches the video calling application created by application developer 561. UE 501 hosts the client-side portion of the video calling application while AS 560 hosts the server-side portion of the video calling application. UE 501 transfers a PDU session request to AMF 521 over 5G RAN 510. The request includes the application ID for the video calling application. AMF 521 selects SMF 522 and transfers a session create request to SMF 522 to establish a PDU session for UE 501 for the video calling application. AMF 521 indicates the application ID of the user application and the MSISDN of UE 501 to SMF 522. SMF 522 requests session context from UDM 524. UDM accesses UE 501's subscriber profile stored by UDR 525 and returns the session context to SMF 522. SMF 522 provides the session context to AMF 521 and initiates PDU session authorization with AS 560. SMF 522 transfers a session authorization request that includes the application ID and MSISDN to NEF 526. NEF 526 exposes the request to AS 560 over AF 527. AS 560 transfers the API call to uplift service for UE 501 in response to UE 501 launching the video calling application. The API call comprises UE 501's MSISDN, the application ID for the video calling application, a video calling QoD request, a URLLC slice request, and the IP address of AS 560. Application developer management system 530 enables QoD service and URLLC slicing for UE 501's PDU session for the video calling application as described in process 1200 illustrated in FIG. 12.

Network API 534 receives the service uplift command from NaaS 537. The command indicates the PDU session is allowed and comprises the video calling QoD profile and slice ID for the URLLC slice. The QoD profile includes latency, throughput, and QoS settings for the PDU session as well as a time (and/or data) duration the latency, throughput, and QoS settings are to be enabled. Network API 534 notifies SMF 522 that the PDU session is allowed. Network API 534 provides the slice ID for the URLLC slice and video calling QoD profile to SMF 522.

SMF 522 receives the approval message, QoD profile, and slice ID. SMF 522 identifies that UPF 523 is part of a URLLC slice and comprises capabilities to meet the QoS, latency, and throughput requirements of the QoD profile. In response, SMF 522 selects UPF 523 to serve the PDU session for UE 501's video conferencing application. SMF 522 directs UPF 523 to serve UE 501 and UPF 523 acknowledges the command.

SMF 522 notifies AMF 521 of the successful session creation. In response, AMF 521 configures 5G RAN 510 to serve the PDU session. AMF 521 directs UE 501 to begin the PDU session for the video calling application. The client-side component of the video calling application hosted by UE 501 generates uplink data and transfers the uplink data to UPF 523 over 5G RAN 510. UPF 523 transfers the uplink data to AS 560. AS 560 routes the uplink data to the data endpoint (e.g., a called UE). The server-side component of the video calling application in AS 560 receives downlink data for the PDU session from the data endpoint. AS 560 transfers the downlink data to UPF 523. UPF 523 delivers the downlink data to UE 501 over 5G RAN 510. AMF 521, SMF 522, and UPF 523 interface to serve UE 501 on the URLLC slice and to meet the QoS, latency, and throughput requirements of the QoD profile for the specified duration. SMF 522 monitors the PDU session to track data usage by UE 501.

Now referring to FIG. 14, in some examples, SMF 522 reports the data usage to CS 532. CS 532 generates a data usage CDR that includes the data usage for the PDU session between UE 501 and AS 560. CS 532 transfers the data usage CDR as well as the developer ID, application ID, network features, IP address, and biller ID to EMM 531. EMM 531 receives the data usage CDR, developer ID, application ID, network features, IP address, and biller ID. EMM 531 identifies the developer ID and responsively enriches the data usage CDR with the developer ID, application ID, network features, IP address, and biller ID. Developer CS 533 generates a runtime usage CDR that includes the runtime/API usage of AS 560. Developer CS 533 reports the runtime usage CDR to EMM 531. EMM 531 receives the runtime usage CDR from developer CS 533. EMM 531 transfers the runtime usage CDR to developer edge 538. EMM 531 transfers the enriched data usage CDR to developer edge 538 based on the inclusion of the developer ID in the data usage CDR.

Developer edge 538 receives the runtime usage CDR and the enriched data usage CDR. Developer edge 538 reads the biller ID included in the runtime usage CDR and determines the end user is to be billed for the PDU session. Developer edge 538 exposes the runtime usage CDR to application developer 561 to bill application developer 561 for the API usage and exposes the enriched data usage CDR to billing system 550 to bill UE 501 for the data usage. Billing system 550 generates a monetary charge for the user of UE 501 based on the enriched data usage CDR.

The wireless data network circuitry described above comprises computer hardware and software that form special-purpose network circuitry to enable selective billing of application developers and end users. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to enable selective billing of application developers and end users.

Although the descriptions provided herein may be in the context of certain radio access technologies, networks, and network topologies, such as 5GNR mobile communications, the proposed concepts, schemes, and any variations thereof may be implemented in, for and by other types of radio access technologies, networks, and network topologies. Such radio access technologies, networks, and network topologies may include, for example and without limitation, LTE, Internet-of-Things (IoT), NB-IoT, Vehicle-to-Everything (V2X), fixed wireless internet, and Non-Terrestrial Network (NTN) communications. Thus, the scope of the disclosure is not limited to the examples described herein.

The above description and associated figures teach the best mode of the invention. For the purpose of teaching inventive principles, some conventional aspects of the best mode may be simplified or omitted. The following claims specify the scope of the invention. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described above, nor the best mode, but only by the claims and their equivalents.

What is claimed is:

1. A method comprising:

receiving, by an application creation engine, a service request for an application from a developer computing system in response to a user device launching the application, wherein the application is associated with the developer computing system;

directing, by the application creation engine, a core network to establish a session for the application in response to the service request;

determining, by the application creation engine, a developer usage amount of the application creation engine by the developer computing system and indicating the developer usage amount to a developer charging system;

determining, by the core network, a user usage amount for the session by the user device and indicating the user usage amount to a user charging system;

generating, by the developer charging system, a developer charge for the developer computing system based on the developer usage amount and surfacing the developer charge to the developer computing system; and generating, by the user charging system, a user charge for the user device based on the user usage amount and surfacing the user charge to a billing system associated with the user device.

2. The method of claim 1 wherein:

indicating, by the application creation engine, the developer usage to the developer charging system comprises indicating the developer usage amount, a developer Identifier (ID) for the developer computing system, and one or more network features for the session for the application to the developer charging system;

generating, by the developer charging system, the developer charge and surfacing the developer charge to the developer computing system comprises generating a developer Call Detail Record (CDR) that indicates the developer usage amount, developer ID, and the one or more network features and surfacing the developer CDR to the developer computing system; and further comprising:

indicating, by the application creation engine, the developer ID, an application ID for the application, the one or more network features, and a biller ID for the billing system to the user charging system; and wherein:

generating, by the user charging system, the user charge and surfacing the user charge to the billing system comprises generating a user CDR that indicates the user usage amount, the developer ID, the application ID, the one or more network features, and the biller ID and surfacing the user CDR to the billing system associated with the user device.

3. The method of claim 1 further comprising:

receiving, by the application creation engine, one or more network feature requests from the developer computing system to create the application;

interfacing, by the application creation engine, with the core network to enable one or more network features for the application requested by the developer computing system.

4. The method of claim 3 wherein:

receiving, by the application creation engine, the service request for the application from the developer computing system comprises receiving the service request to enable the one or more network features for the session for the application from the developer computing system; and directing, by the application creation engine, the core network to establish the session for the application comprises authorizing the one or more network features for the application and directing the core network to enable the one or more network features for the session for the application.

5. The method of claim 4 wherein the one or more network features comprise a network slice for the application.

6. The method of claim 4 wherein the one or more network features comprise a Quality-of-Service (QoS) for the application.

7. The method of claim 4 wherein the one or more network features comprise a Quality-on-Demand (QoD) for the application.

8. The method of claim 4 wherein the one or more network features comprise a latency for the application.

9. The method of claim 4 wherein the one or more network features comprise a throughput for the application.

10. A system comprising:

an application creation engine configured to:

receive a service request for an application from a developer computing system in response to a user device launching the application, wherein the application is associated with the developer computing system;

direct a core network to establish a session for the application in response to the service request;

determine a developer usage amount of the application creation engine by the developer computing system; and indicate the developer usage amount to a developer charging system;

the core network configured to:

determine a user usage amount of the session by the user device; and indicate the user usage amount to a user charging system;

the developer charging system configured to:

generate a developer charge for the developer computing system based on the developer usage amount; and surface the developer charge to the developer computing system; and the user charging system configured to:

generate a user charge for the user device based on the user usage amount; and surface the user charge to a billing system associated with the user device.

11. The system of claim 10 wherein:

the application creation engine is further configured to:

indicate the developer usage amount, a developer Identifier (ID) for the developer computing system, and one or more network features for the session for the application to the developer charging system; and indicate the developer ID, an application ID for the application, the one or more network features, and a biller ID for the billing system to the user charging system;

the developer charging system is further configured to:

generate a developer Call Detail Record (CDR) that indicates the developer usage amount, developer ID, and the one or more network features; and surface the developer CDR to the developer computing system; and the user charging system is further configured to:

generate a user CDR that indicates the user usage amount, the developer ID, the application ID, the one or more network features, and the biller ID; and surface the user CDR to the billing system associated with the user device.

12. The system of claim 10 wherein the application creation engine is further configured to:

receive network feature requests from the developer computing system to create the application; and interface with the core network to enable one or more network features for the application requested by the developer computing system.

13. The system of claim 12 wherein the application creation engine is further configured to:

receive the service request to enable the one or more network features for the session for the application from the developer computing system;

authorize the one or more network features for the application; and direct the core network to enable the one or more network features for the session for the application.

14. The system of claim 13 wherein the one or more network features comprise a network slice for the application.

15. The system of claim 13 wherein the one or more network features comprise a Quality-of-Service (QoS) for the application.

16. The system of claim 13 wherein the one or more network features comprise a Quality-on-Demand (QoD) for the application.

17. The system of claim 13 wherein the one or more network features comprise a latency for the application.

18. The system of claim 13 wherein the one or more network features comprise a throughput for the application.

19. One or more non-transitory computer readable storage media having program instructions stored thereon, wherein the program instruction, when executed by a computing system, direct the computing system to perform operations, the operations comprising:

receiving an Application Programming Interface (API) call from an application developer computing system that requests an enablement of one or more network features for a session for an application launched by a user device, wherein the application developer computing system is associated with the application;

authorizing the requested one or more network features for the session for the application launched by the user device;

directing a core network to enable the one or more network features for the session for the application;

indicating a developer Identifier (ID) for the application developer computing system, developer network usage, and the one or more network features to a developer charging system wherein the developer charging system generates a developer Call Detail Record (CDR) that indicates the developer ID, the developer network usage, and the one or more network features and surfaces the developer CDR to the application developer computing system; and indicating the developer ID, an application ID for the application, the one or more network features, and a biller ID for a billing system associated with the user device to a user charging system wherein the user charging system receives user network usage from the core network, generates a user CDR that indicates the user network usage, the developer ID, the application ID, the one or more network features, and the biller ID, and surfaces the user CDR to the billing system associated with the user device.

20. The one or more computer readable storage media of claim 19 wherein the one or more network features comprise one or more of a network slice, a Quality-of-Service (QoS), a Quality-on-Demand (QoD), a latency, or a throughput for the application.

* * * * *